(12) United States Patent
Chin et al.

(10) Patent No.: US 11,314,344 B2
(45) Date of Patent: Apr. 26, 2022

(54) HAPTIC ECOSYSTEM

(71) Applicant: RAZER (ASIA-PACIFIC) PTE. LTD., Singapore (SG)

(72) Inventors: Wooi Liang Chin, Singapore (SG); Chung Wei Lee, Singapore (SG); Shiuwen Wong, Singapore (SG); Min-Liang Tan, Singapore (SG); Ping He, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 17 days.

(21) Appl. No.: 16/380,459

(22) Filed: Apr. 10, 2019

(65) Prior Publication Data
US 2019/0235640 A1   Aug. 1, 2019

Related U.S. Application Data

(63) Continuation-in-part of application No. 14/952,614, filed on Nov. 25, 2015, now abandoned, which is a
(Continued)

(51) Int. Cl.
*G06F 3/038*   (2013.01)
*H04L 29/06*   (2006.01)
(Continued)

(52) U.S. Cl.
CPC ............ *G06F 3/038* (2013.01); *A63F 13/215* (2014.09); *A63F 13/235* (2014.09);
(Continued)

(58) Field of Classification Search
CPC .. G09G 5/00; H04N 7/10; G06F 3/033; G06F 3/0488; G06F 3/04812; G06F 16/48; G06F 40/166; A63F 13/5255; A63F 13/2145
See application file for complete search history.

(56) References Cited

U.S. PATENT DOCUMENTS

| 6,359,661 B1 | 3/2002 | Nickum |
| 6,563,430 B1 | 5/2003 | Kemink et al. |
| | (Continued) | |

FOREIGN PATENT DOCUMENTS

| CN | 101030204 A | 9/2007 |
| CN | 101378393 A | 3/2009 |
| | (Continued) | |

OTHER PUBLICATIONS

First Office Action dated Nov. 20, 2017 in corresponding Korean Patent Application No. 10-2017-7022857, 11 pages.
(Continued)

*Primary Examiner* — Steven P Sax
(74) *Attorney, Agent, or Firm* — Polsinelli PC

(57) ABSTRACT

A method, a computer readable medium, and an apparatus for providing haptic feedback through a plurality of haptic devices are provided. The apparatus may receive a multi-channel audio stream. The apparatus may split the multi-channel audio stream into a plurality of audio channels. For each haptic signal of a plurality of haptic signals, the apparatus may generate the haptic signal based on one or more audio channels of the plurality of audio channels. For each haptic signal of the plurality of haptic signals, the apparatus may transmit the haptic signal to a corresponding haptic device of the plurality of haptic devices to produce the haptic feedback.

18 Claims, 14 Drawing Sheets

Related U.S. Application Data continuation of application No. 12/959,707, filed on Dec. 3, 2010, now Pat. No. 9,235,277.

(60) Provisional application No. 62/783,022, filed on Dec. 20, 2018.

(51) Int. Cl.

| | |
|---|---|
| *G06F 3/01* | (2006.01) |
| *H04L 67/303* | (2022.01) |
| *G06F 3/04855* | (2022.01) |
| *G06F 3/0484* | (2022.01) |
| *A63F 13/71* | (2014.01) |
| *A63F 13/285* | (2014.01) |
| *A63F 13/235* | (2014.01) |
| *A63F 13/215* | (2014.01) |
| *A63F 13/355* | (2014.01) |
| *A63F 13/79* | (2014.01) |
| *H04L 67/10* | (2022.01) |
| *A63F 13/54* | (2014.01) |

(52) U.S. Cl.
CPC .......... *A63F 13/285* (2014.09); *A63F 13/355* (2014.09); *A63F 13/54* (2014.09); *A63F 13/71* (2014.09); *A63F 13/79* (2014.09); *G06F 3/01* (2013.01); *G06F 3/016* (2013.01); *G06F 3/0484* (2013.01); *G06F 3/04855* (2013.01); *H04L 63/08* (2013.01); *H04L 67/10* (2013.01); *H04L 67/303* (2013.01); *A63F 2300/1018* (2013.01); *A63F 2300/5546* (2013.01)

(56) References Cited

U.S. PATENT DOCUMENTS

| | | | |
|---|---|---|---|
| 7,040,987 B2 | 5/2006 | Walker et al. | |
| 7,425,675 B2 * | 9/2008 | Chu ................. | G06F 3/016 84/645 |
| 2002/0151366 A1 | 10/2002 | Walker et al. | |
| 2003/0067440 A1 * | 4/2003 | Rank ................. | A63F 13/5255 345/156 |
| 2004/0212595 A1 | 10/2004 | Zhou | |
| 2004/0229698 A1 | 11/2004 | Lind et al. | |
| 2005/0052714 A1 * | 3/2005 | Klug ................. | G03H 1/22 359/3 |
| 2005/0132126 A1 * | 6/2005 | Lin ................... | G06F 3/064 711/103 |
| 2005/0261815 A1 * | 11/2005 | Cowelchuk ..... | B60Q 5/00 701/36 |
| 2006/0293151 A1 * | 12/2006 | Rast ................. | A63B 21/0023 482/8 |
| 2007/0060408 A1 * | 3/2007 | Schultz ........... | A63F 13/12 473/131 |
| 2007/0112983 A1 | 5/2007 | Yamada et al. | |
| 2007/0118804 A1 | 5/2007 | Raciborski et al. | |
| 2007/0137462 A1 * | 6/2007 | Barros ............. | G10H 1/0058 84/453 |
| 2007/0168315 A1 * | 7/2007 | Covannon ....... | G06F 40/166 |
| 2007/0283059 A1 | 12/2007 | Ho et al. | |
| 2008/0195970 A1 * | 8/2008 | Rechsteiner .... | G06F 16/48 715/810 |
| 2008/0319252 A1 * | 12/2008 | Chapman ........ | A63F 13/2145 600/27 |
| 2009/0063179 A1 | 3/2009 | Huang | |
| 2009/0088659 A1 * | 4/2009 | Graham .......... | G06F 3/016 600/545 |
| 2009/0096632 A1 * | 4/2009 | Ullrich ............ | H04N 21/4307 340/4.21 |
| 2009/0100129 A1 | 4/2009 | Vigil et al. | |
| 2009/0150814 A1 | 6/2009 | Eyer et al. | |
| 2009/0153350 A1 * | 6/2009 | Steger ............. | G04F 5/025 340/4.2 |
| 2009/0160666 A1 * | 6/2009 | Jha ................. | H02J 7/32 340/665 |
| 2009/0167715 A1 * | 7/2009 | Wang .............. | G06F 3/016 345/173 |
| 2009/0231276 A1 * | 9/2009 | Ullrich ........... | G10L 21/06 345/157 |
| 2009/0280860 A1 * | 11/2009 | Dahlke ........... | G06F 3/016 455/556.1 |
| 2010/0017759 A1 * | 1/2010 | Birnbaum ....... | G08B 6/00 715/863 |
| 2010/0079356 A1 * | 4/2010 | Hoellwarth ..... | G06F 3/041 345/8 |
| 2010/0134619 A1 * | 6/2010 | Hampapur ...... | G06Q 10/04 348/143 |
| 2010/0169910 A1 * | 7/2010 | Collins ........... | H04N 21/25891 725/14 |
| 2010/0240458 A1 * | 9/2010 | Gaiba ............. | G06F 3/015 463/36 |
| 2010/0260371 A1 * | 10/2010 | Afshar ............ | H04R 7/24 381/394 |
| 2010/0262673 A1 | 10/2010 | Chang et al. | |
| 2011/0034176 A1 | 2/2011 | Lord et al. | |
| 2011/0098056 A1 * | 4/2011 | Rhoads ........... | G09G 5/00 455/456.1 |
| 2011/0111799 A1 | 5/2011 | Kothari et al. | |
| 2011/0128132 A1 * | 6/2011 | Ullrich ........... | G06F 3/16 340/407.1 |
| 2011/0228962 A1 * | 9/2011 | Taylor ............ | G10H 1/0008 381/322 |
| 2011/0239144 A1 * | 9/2011 | Rapp .............. | G06F 8/38 715/765 |
| 2012/0126959 A1 * | 5/2012 | Zarrabi .......... | H01L 41/293 340/407.1 |
| 2013/0207793 A1 * | 8/2013 | Weaber .......... | G08B 6/00 340/407.2 |

FOREIGN PATENT DOCUMENTS

| | | |
|---|---|---|
| KR | 10-2010-0107113 A | 10/2010 |
| TW | I268417 B | 12/2006 |
| TW | 2008/41260 A | 10/2008 |
| TW | I312465 B | 7/2009 |
| WO | WO 2012/022185 A1 | 2/2012 |

OTHER PUBLICATIONS

First Office Action dated Mar. 27, 2015 in Chinese patent application No. 2011/80058303.3.

Taiwan Intellectual Property Office, First Office Action dated Feb. 9, 2015, for Taiwanese Patent Application No. 100143756.

International Preliminary Report on Patentability dated Jul. 30, 2012 for PCT Appin. No. PCT/SG2011/000426, filed Dec. 5, 2011, titled Profile Management Method, inventors Min-Liang Tan et al.

Office Action (including English Translation) dated Mach 29, 2019, for the corresponding Chinese Application No. 201710107248.1 in 39 total pages.

Office Action (including English Translation) dated Apr. 18, 2019, for the corresponding Chinese Application No. 201710107211.9 in 31 total pages.

\* cited by examiner

| 31 | 36 | 40 | 42 |
|---|---|---|---|
| ||||  | ||||  | ||||  | ||||  |

FIG. 5

HAPTIC ECOSYSTEM

CROSS-REFERENCE TO RELATED APPLICATIONS

This application claims the benefit of U.S. Provisional Patent Application No. 62/783,022, entitled "HAPTIC ECOSYSTEM" and filed on Dec. 20, 2018. This application is also a continuation-in-part of U.S. patent application Ser. No. 14/952,614, entitled "PROFILE MANAGEMENT METHOD" and filed on Nov. 25, 2015, which is a continuation of U.S. patent application Ser. No. 12/959,707, entitled "PROFILE MANAGEMENT METHOD" and filed on Dec. 3, 2010, now U.S. Pat. No. 9,235,277. Each of U.S. patent application Ser. Nos. 62/783,022, 14/952,614, and 12/959,707 is expressly incorporated by reference herein in its entirety.

TECHNICAL FIELD

Various aspects of this disclosure generally relate to peripheral devices for computing systems. In particular, the invention relates to a system and method for managing the profile of peripheral devices for user-interfaces of computing systems.

BACKGROUND

In most computer games, speed and accuracy are often of significant importance to gamers. Familiarity with gaming control configurations will therefore determine how one performs in the game. Typically, frequent gamers have a specific set of customised device configurations uniquely suited for their game play. For example, to initiate a punch or to engage a weapon, gamers are able to re-assign combinations of keys on the keyboard or on the mouse to initiate different UI control. Gamers often do not break away from this set of configuration as it allows them familiarity and hence speed and control during gaming.

Some of these gamers are even equipped with their own preferred peripheral devices. Computer peripheral devices include but are not limited to computer mice, keyboards, handheld gaming consoles and joysticks. Known computer peripheral devices are typically interchangeable and can be used with different computer systems and platforms. Most computer operating systems are able to automatically configure the coupled computer peripheral device for use with the computer operating system without the need for installation of a specific driver. However, when these peripheral devices are detected by the computing system, a generic UI control configuration is often assigned to them and whatever customised settings previously configured by the user will be lost and replaced with default settings. This poses much inconvenience and hassle to gamers when they enter LAN-gaming shops or utilise computers for their gaming pleasures as they would have to reconfigure the control settings to suit their preferences.

There is, therefore, an apparent need for a method whereby these device settings and configurations can be stored and retrieved on the fly so that users can do away with the hassle of re-configuring their control settings whenever they use a different platform to access the different peripheral devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with a first aspect of the invention, there is disclosed a profile management method comprising receiving client data provided by a computing system, with the client data comprising device data being descriptive of a user-interface (UI) in signal communication with the computing system, and associating one of a plurality of device profiles with the device data, each of the plurality of device profiles having configuration data associated therewith. The device data is further descriptive of the user interactions identifiable by the UI. The profile management system further comprises providing the configuration data associated with the one of the plurality of device profiles to the computing system for configuring operation of the UI with the computing system therewith.

In accordance with a second aspect of the invention, there is disclosed a profile management system comprising a controller module for receiving client data provided by a computing system. The client data comprises device data being descriptive of a user-interface (UI) in signal communication with the computing system. The device data is further descriptive of the user interactions identifiable by the UI. The profile management system further comprises a storage module having stored thereon a plurality of device profiles, each of the plurality of device profiles having configuration data associated therewith, and a processor module for associating one of a plurality of device profiles stored on the storage module with the device data. The configuration data associated with the one of the plurality of device profiles is providable by the controller module to the computing system for configuring operation of the UI with the computing system therewith.

In accordance with a third aspect of the invention, there is disclosed a machine readable medium having stored therein a plurality of programming instructions, which when executed, the instructions cause the machine to: receive client data provided by a computing system, the client data comprising device data being descriptive of a user-interface (UI) in signal communication with the computing system, the device data being further descriptive of the user interactions identifiable by the UI; associate one of a plurality of device profiles with the device data, each of the plurality of device profiles having configuration data associated therewith; and provide the configuration data associated with the one of the plurality of device profiles to the computing system for configuring operation of the UI with the computing system therewith.

In an aspect of the disclosure, a method, a computer readable medium, and an apparatus for providing haptic feedback through a plurality of haptic devices are provided. The apparatus may receive a multi-channel audio stream. The apparatus may split the multi-channel audio stream into a plurality of audio channels. For each haptic signal of a plurality of haptic signals, the apparatus may generate the haptic signal based on one or more audio channels of the plurality of audio channels. For each haptic signal of the plurality of haptic signals, the apparatus may transmit the haptic signal to a corresponding haptic device of the plurality of haptic devices to produce the haptic feedback.

In another aspect of the disclosure, a method, a computer readable medium, and an apparatus for providing haptic feedback through a plurality of haptic devices are provided. The apparatus may receive a multi-channel audio stream. The apparatus may split the multi-channel audio stream into a plurality of audio channels and a set of haptic channels. The apparatus may derive a plurality of haptic signals based on the set of haptic channels. For each haptic signal of the plurality of haptic signals, the apparatus may transmit the haptic signal to a corresponding haptic device of the plurality of haptic devices to produce the haptic feedback.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Figure 5:
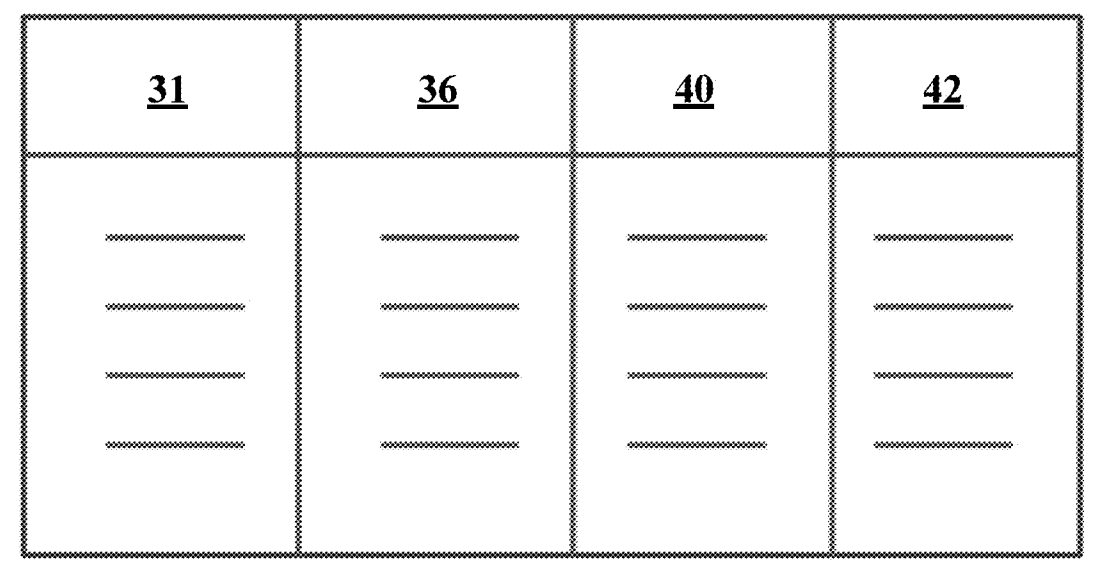

FIG. 5 shows an arrangement of device profile, configuration data, user identifier and authentication data residing on the profile management system of FIG. 1.

DETAILED DESCRIPTION

Figure 1:
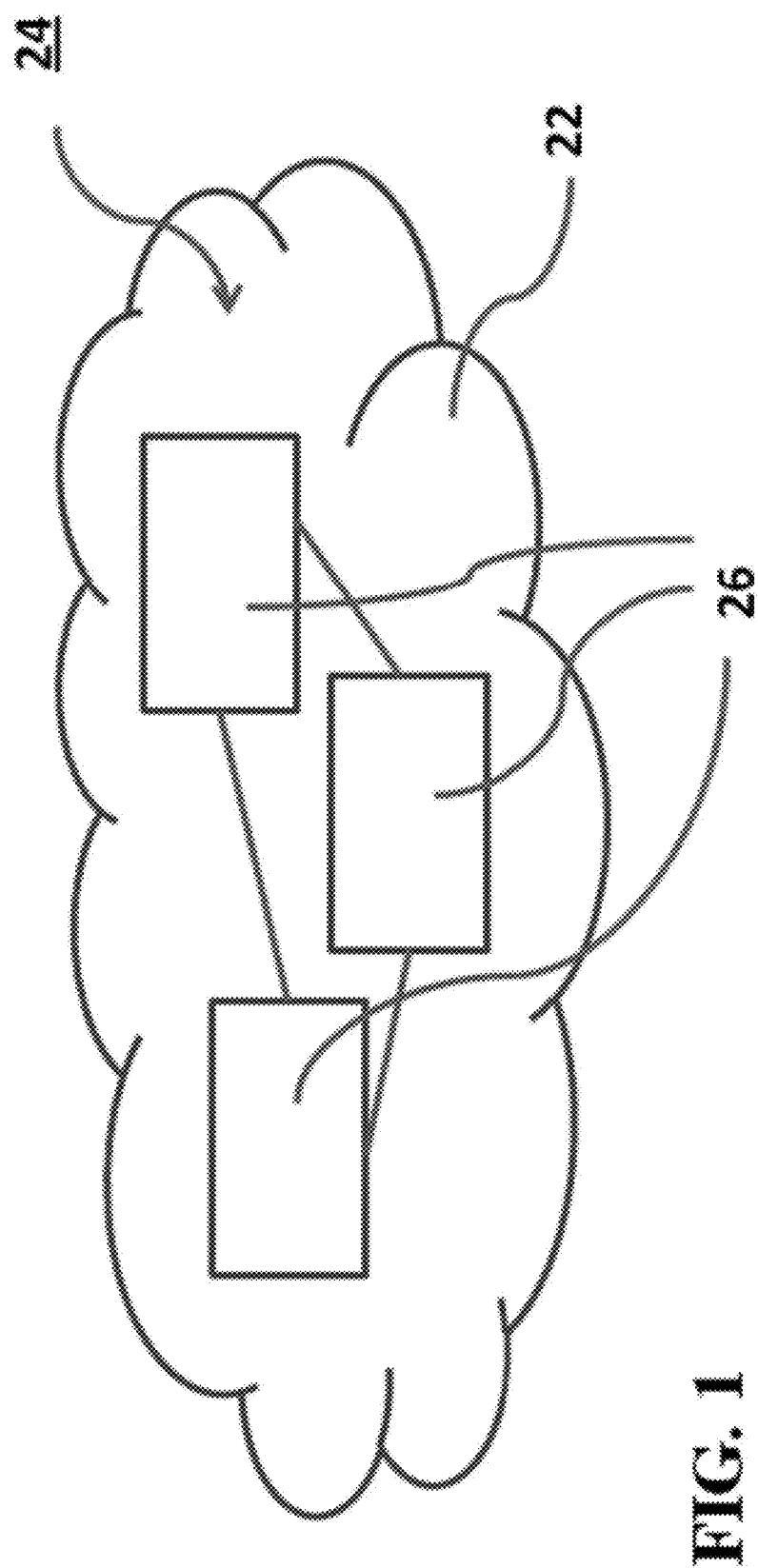
FIG. 1 shows a system diagram of a profile management system residing on a computing cloud according to an exemplary embodiment of the invention.
Figure 2:
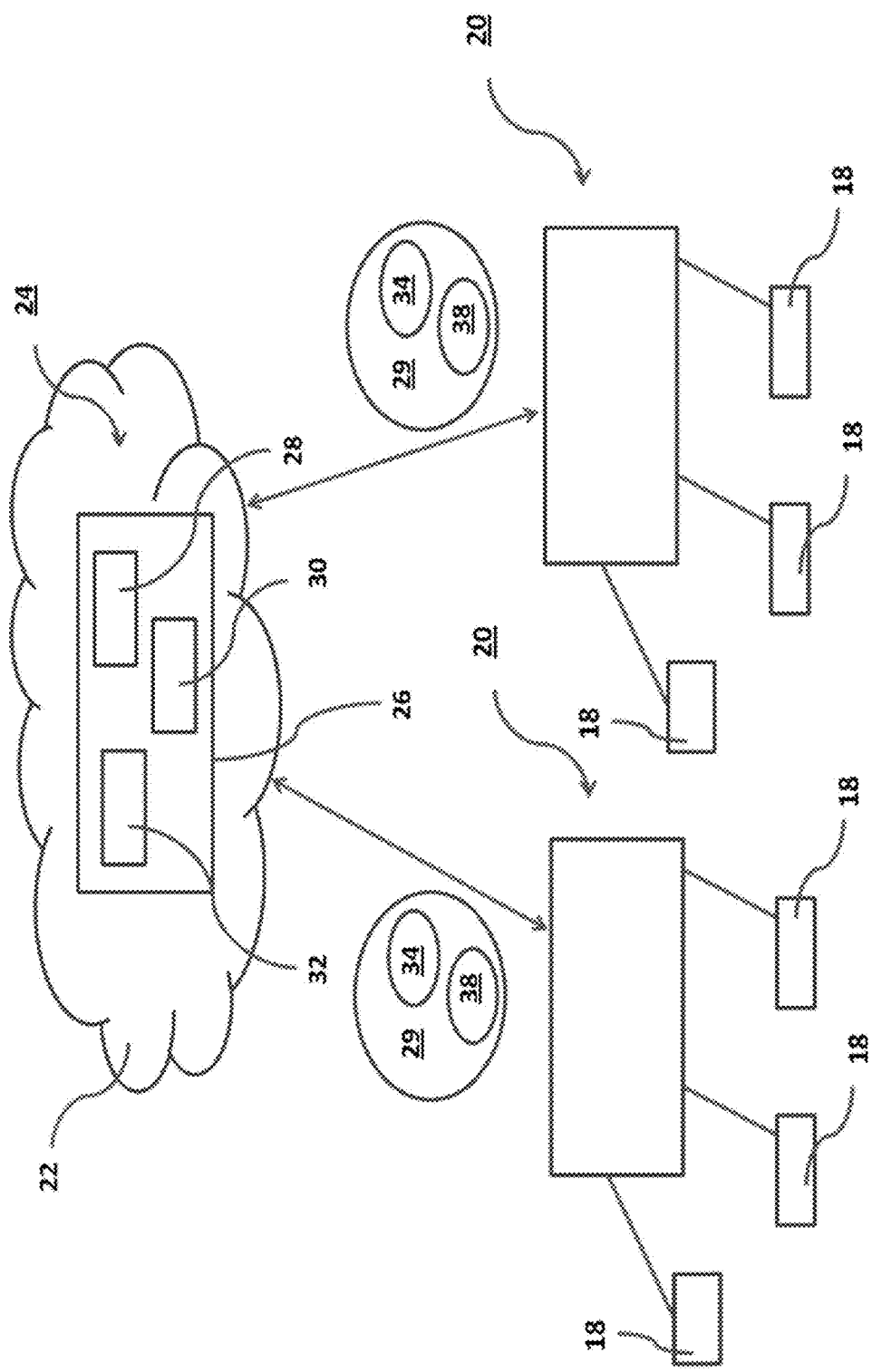
FIG. 2 shows a system diagram of the profile management system of FIG. 1 with user-interfaces in signal communication with computing systems coupled thereto.
Figure 3:
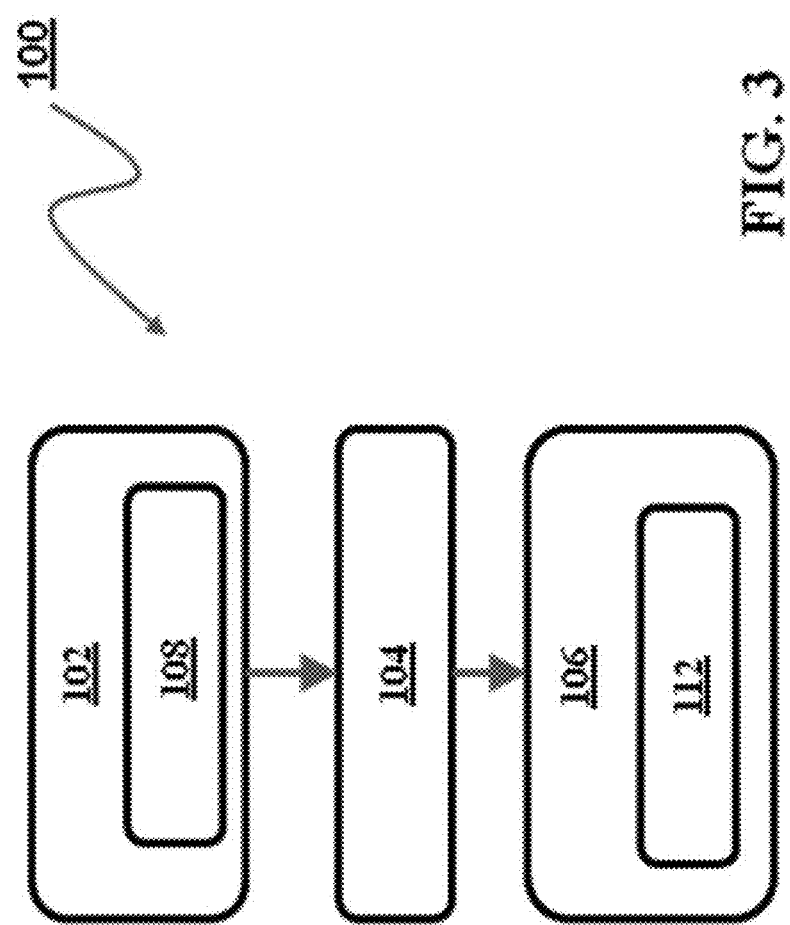
FIG. 3 shows a process flow diagram of a profile management method for implementation by the collaboration management system of FIG. 1.
Figure 4:
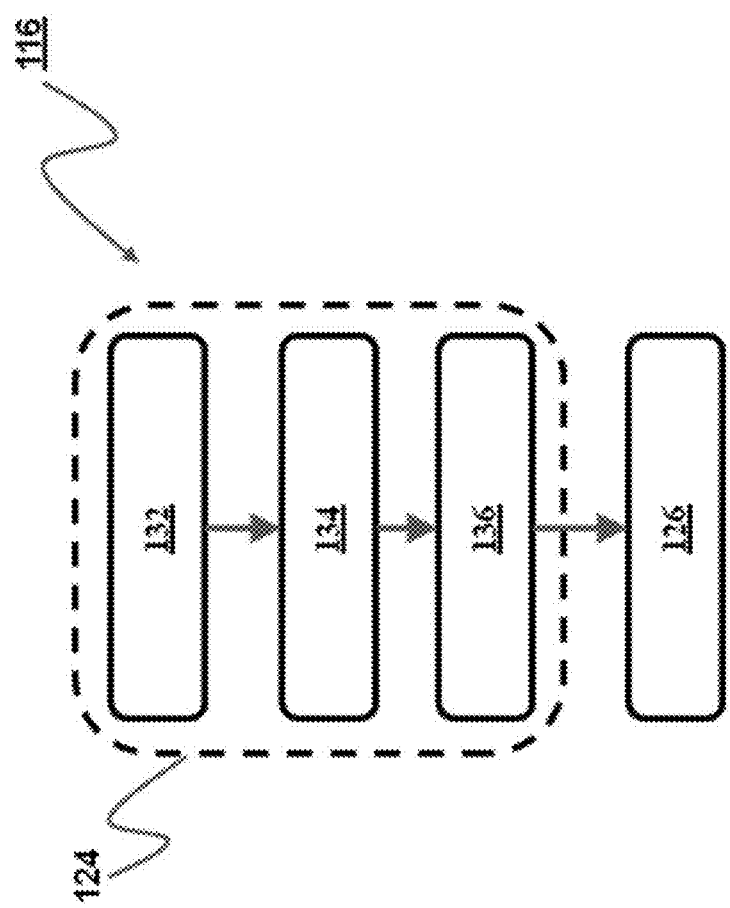
FIG. 4 shows a process flow diagram of a device discovery method for implementation by the computing systems of FIG. 2.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of managing profile of peripheral devices for user-interfaces of computing systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Reference will now be made in detail to an exemplary embodiment of the present invention, examples of which are illustrated in the accompanying drawings. While the invention will be described in conjunction with the embodiment, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

For purposes of brevity and clarity, descriptions of embodiments of the present invention are limited hereinafter to the transfer and management of device profiles, in particular, device configurations, to client device associated with the computing system. This however does not preclude embodiments of the invention where fundamental principles prevalent among the various embodiments of the invention such as operational, functional or performance characteristics are required.

An exemplary embodiment of the invention, a profile management method 100, is described hereinafter. The profile management method 100 is preferably for managing configuration of user interfaces (UI) 18 coupled to computing system 20 in communication with a computing cloud 22. Further described, with reference to FIGS. 1 to 6, is a profile management system 24, residing on the computing cloud 22, for applying the profile management method 100.

Generally, the profile management system 24 enables a configuration for UIs 18 to be created by a user so that the configuration can be readily accessed from different locations or from different computer terminals when the same or similar type of UI 18 is used. For example, when a user carries a personal mouse from location to location, the user does not have to reconfigure the mouse at each new location or at a new computer terminal. The configuration for the UI 18, including the preferred settings therefor, are downloadable via the computer terminal the UI 18 is coupled to. This even applies to newly acquired devices where the UI 18 thereof can be configured for use "out of the box" via downloading the corresponding configuration previously created by a user, a third party, the device manufacturer or an application developer, for example, a gaming application. The configurations for the UIs 18 are preferably stored on one or more servers with each configuration catering to a specific, or similar, UI type and relating to a specific user identified by a user identifier. Download of the configuration can be initiated via various means including by the coupling of the UI 18 to a computer system, connecting to a specific network address, for example an IP address or a URL, launching of a particular application or game application or through operating of controls within an application. Preferably, information on the UI type is providable to the one or more server so that the configuration corresponding to the UI type, and preferably further corresponding to a particular user ID, can be identified for download and subsequent configuration of the corresponding UI 18.

With reference to FIGS. 1 to 5, the computing cloud 22 comprises one or multiple server systems 26 inter-networked and configured to function as the profile management system 24. Communication pathway between the computing cloud 22 and the computing system 20 is preferably provided via a local area network (LAN), a wide area network (WAN), the Internet, cellular networks, data networks, dedicated networks or a combination of any thereof.

The profile management system 24 comprises a controller module 28 for receiving client data 29 provided by the computing system 20, a storage module 30 for storing a plurality of device profiles 31 and a processor module 32. The client data 29 comprises device data 34 for associating with one of the plurality of the device profiles 31 by the processor module 32.

The profile management method 100 comprises a step 102 of receiving the client data 29 providable by the computing system 20 by the profile management system 24, a step 104 of associating one of the plurality of device profiles 31 within the profile management system 24 with the client data 29 and a step 106 of providing configuration data 36 associated with one of the plurality of device profiles 31 to the computing system 20 for configuration of the UI 18 thereafter.

The device data 34 is preferably descriptive of the UI 18 associated with the computing system 20. The device data 34 is further descriptive of the user interactions identifiable by the UI 18. Preferably, the UI 18 is one of a computer peripheral coupled with an interface formed integral with the computing device. Examples of computer peripherals include but are not limited to gaming console, joystick, computer mouse, keyboard and speakers. Alternatively, the UI 18 includes devices which are connectable for use with or forms part of the computing system 20, for example, the touch screen display of a cell phone or a smart phone with the non-UI portions of the cell phone or smart phone forming the computing system 20. The UI 18 is preferably at least one of actuation, for example mouse button actuation or key presses, touch, light, sound, motion and position sensing. Detection and recognition of the UI 18, or its functional equivalent, occurs when the UI 18 is in signal communication with the computing system 20. The computing system 20 generates the device data 34 for the UI 18 when the UI 18 is recognised thereby. For example, if the UI 18 is a 3D mouse, the user interactions identifiable by the 3D mouse would include free-space movement or position, scrolling actions and actuation of specific buttons existing on the 3D mouse. However, if the UI 18 is a multi-touch interface, the user interactions identifiable by the multi-touch interface would include locations of one or more points and gestures generatable by the one or more touch points on the multi-touch interface. Therefore, the user interactions identifiable and hence the device data when the UI 18 is a 3D mouse differs from when the UI 18 is a multi-touch interface.

When a user couples the UI 18 to the computing system 20 in network communication to the computing cloud 22, the profile management system 24 is able to receive the client data 29 generated by the computing system 20. The UI 18 may be connected to the computing system 20 via wired or wireless signal connection. Detection of the UI 18 can be configured by the user to be in response to coupling of the UI 18 to the computing system 20 or to be effected by the user by executing a routine or application on the computing system. Application programming interfaces (APIs) or components of software development kits (SDKs) is preferably made available for programmers, game developers and application developers to incorporate the function of detecting the UI 18 onto their computing systems 20 and software applications. This will provide the user with better control over how and when the UI 18 is to be detected for discovery and sending of the client data 29 to the profile management system 24. The APIs and components of SDKs may be provided for development of auto-executable routines residing on the UI 18 for initiating the profile management method 100 upon detection thereof by the computing system 20 when the UI 18 is coupled thereto. In such an instance, the device data 34 specific to the UI 18 may be pre-defined and preloaded onto the UI 18, preferably, onto a memory module residing on the UI 18.

Preferably, the client data 29 further comprises identifier data 38 uniquely matched to at least one of a plurality of user identifiers 40 residing on the storage module 30. Upon receiving of the client data 29 by the profile management system 24 in the step 102, the profile management system 24 further processes the client data 29 for either user registration or log-on to the profile management system 24. For an existing user with an identity existing as one of the plurality of user identifiers 40 on the storage module 30, access to the profile management system 24 triggers the processor module 32 to associate the particular one of the user identifiers 40 with the identifier data 38. Upon associating the one of the user identifiers 40 with the identifier data 38, the one of the device profiles 31 and the configuration data 36 corresponding thereto are consequently identified. As an alternative over the identifier data 38 or in the absence of the identifier data 38, the device data 34 may be used for identifying the corresponding one of the device profiles 31 and the corresponding configuration data 36. In an event where none of the device profiles 31 exactly matches the device data 38, a closest matching one of the device profiles 31 may be selected instead. The controller module 28 can be configured to select a closest matching one of all the device profiles 31 on the storage module 30 or a closest matching one of only the device profiles 31 associated with a particular one of the user identifiers 40.

In an example of use of the profile management system 24, a user couples his multi-touch device, the UI 18, to a public computer, the computing system 20. One or both of the multi-touch device and the public computer may be pre-loaded with a sub-routine to automatically connect to the profile management system 24 for initiating the profile management method 100. Alternatively, the user can manually connect with the profile management system 24, for example, via a URL using a web browser. Once the profile management method 100 has been initiated, the multi-touch device will send information, the client data 19, to the profile management system 24 indicating that it is of a multi-touch device type, the device data 34. The sent information can include the user's name or a user identifier, the identifier data 38. On the profile management system 24, the user identifier 40 matching with the user's name may have multiple device profiles 31 associated therewith, for example various types of devices including a 3-D mouse, a specific model of gaming mouse and a multi-touch device. With the sent information indicating that the multi-touch device is of a multi-touch device type, the profile management system 24 can isolate the corresponding one of the multiple device profiles 31 for extracting the configuration data 36 corresponding 36 thereto. The configuration data 36 can include, for the multi-touch device, a library of gestures and corresponding instructions for download to the public computer for configuring use of the multi-touch device with the public computer. Upon the multi-touch device being configured with the public computer, the user can immediately interact with the multi-touch device to generate instructions with gestures the user is familiar with without having to redefine gestures and corresponding instructions.

In another example of use of the profile management system 24, the multi-touch device is a newly acquired device connectable to the profile management system 24, via the user's personal computer, the computing system 20, for locating and downloading a popular gesture library or a library of gesture provided by the manufacturers of the multi-touch device, the configuration data 36 for use in configuring the multi-touch device with the user's personal computer. In yet another example of use of the profile management system 24, the UI 18 is a gaming mouse for use with a public computer, the computing system 20. A user with his preferred settings, the configuration data 36, stored on the profile management system 24 is able to connect the public computer to the profile management system 24 for downloading the configuration data 36 to the public computer. The configuration data for the gaming mouse could include one or more of button configuration, scroll-wheel and mouse displacement sensitivity and lighting or haptic feedback response to the gaming mouse. The availability of the configuration data 36 on the profile management system 24 allows the user to quickly configure the gaming mouse, or other UIs 18, when using the public computer.

For retrieval of configuration data 36 from the profile management system 24 in the step 104, the user may either log-on to the profile management system 24 to retrieve stored configuration data 36 accessible to the public or choose to retrieve device data previously uploaded to the profile management system 24 associated with the user identifier 40 belonging to the user. Download of the configuration data 36 by other users is preferably determined by permission settings associated with the configuration data 36. Upon receiving client data 29 by the controller module 28, the profile management system 24 may initiate automated download of the configuration data 36 associated with the device profile 31 matching with the device data 34 of the provided client data 29 in the step 106.

Preferably, the step 102 of receiving client data 29 comprises a step 108 of receiving authentication information (unreferenced) from the computing system 20, for example a password provided by a user, to authenticate the identifier data 34 using the authentication data 42 corresponding thereto. Preferably, the profile management system 24 is configured such that the configuration data 36 in association with the identified one of the device profiles 31 will only be provided by the controller module 28 to the computing system 20 in the step 106 when the identifier data 34 is authenticated. Preferably, the configuration data 36 substantially defines interactions between the UI 18 and at least one of an application and an operating platform operating on the computing system 20. In gaming applications, the configuration data 36 can be a single or a permutation of a plurality of keys on the keyboard for game control such as to engage a weapon or to cast a spell. In non-gaming applications, configuration data can include voice activated commands or gestures to manipulate UI 18 on touch interfaces.

When there exists a mismatch of operating platforms supported by the computing system 20 and which the stored configuration data operates on, the step 106 comprises a step 112 of processing the configuration data 36 for compliance with an operating platform so that the configuration data 36 downloadable from the profile management system 24 can be correctly recognised and configured for operation of the UI 18 with the computing system 20. The operating platform is definable by platform data (unreferenced) constituting a portion of the client data 29 generatable by the computing system 20 for provision to the profile management system 24.

Complementary to and in association with the profile management method 100, there exists a device discovery method 116 configurable by the user for edited of data on the profile management system 24. The device discovery method 116 is preferably applied by the computing system 20. The device discovery method 116 comprises a step 124 of providing client data 29 for log-on to the profile management system 24 and a step 126 of uploading the device data 34 to the profile management system 24.

The step 124 further comprises at least one of a step 132 for detecting coupling of the UI 18 to the computing system 20, a step 134 for manually keying in of identifier data 38 to effect log-on to the profile management system 24 and a step 136 for registering a new user identifier 40 with the profile management system 24. Preferably in the step 132, the computing system 20 detects signal communication of the UI 18 with and generates the client data to effect an automated log-on to the profile management system 24 by associating the identifier data 38 with one of the device profiles 31. Alternatively, the user may configure settings of the device discovery method 116 such that a log-on prompt will be initiated for requesting provision of the identifier data 38 upon the computing system 20 detecting signal communication of the UI 18 therewith. The user will then be required to manually key-in the identifier data 38 in the step 134 for access to the profile management system 24. In the step 136, a new user may register with the profile management system 24 by following through with a registration process. The registration process may request the new user to either manually key-in new identifier data 38 to be stored on the storage module 30 as one of the user identifiers 40 or couple a new device to the computing system 20 for extraction of the identifier data 38 therefrom.

In the step 126, a user may define and upload new client data 24 onto the storage module 30 in the profile management system 24 under one of the user identifiers 40. The device data 34 in association with the client data 29 will be stored in the profile management system 24 as one of the device profiles 31. The configuration data 36 for new UI settings and configuration will also be uploaded for storage by the profile management system 24 and will be registered as being associated with the newly created one of the device profiles 31. Preferably, the profile management system 24 allows for subsequent editing of the configuration data 36 after being uploaded to the storage module 30.

In the gaming context, for gamers who are always on the move, their preferred settings configurations for computer peripherals, either general settings or game-specific settings, are made storable and accessible through a multitude of devices and platforms. In LAN-gaming shops or at any public access terminal, garners have their preferred settings configurations on the fly and downloadable via the profile management system 24 to any terminal or platform in network communication thereto. Users with new gaming devices can also utilize the profile management system 24 to obtain a set of basic setting configuration for the UI 18 without having to manually configure control for any possible manipulation of the UI 18. Update or modification of setting configurations from any computing system 20 in network communication with the profile management system 24 is also an available option.

Additionally, the profile management system 24 is able to process usage information and data stored in the storage module 30 for a variety of applications, including data analytics, and for access by users or third parties. The storage module 30 is preferably accessible by a third party. The third party includes, for example, a games developer, an advertiser or a network service provider. In addition, knowledge of the configuration preferences of users, in particular garners, will enable game developers to design products that will better satisfy consumers.

In a non-gaming context, for example, when a user connects a multi-touch screen smart phone to profile management system 24 on the computing cloud 22, or when voice command memos are being downloaded from the cell phone to the computing system 20, configurations previously stored in the smart phone for manipulation of the UI 18 as well as specific voice activated commands used previously in the cell phone can be downloaded from the profile management system 24 and thereby be used with the computing system 20, having the various commands or controls mimicked seamlessly.

The profile management method 100 preferably resides on the profile management system 24 as a plurality of instructions stored on a machine readable medium of the profile management system 24. It is preferred that the instructions, when executed, cause the profile management system 24 to perform the step of the profile management method 100. Similarly, the device discovery method 116 exists on the computing system 20 as a plurality of instructions stored on a machine readable medium thereof. It is preferred that the instructions, when executed, cause the profile management system 24 to perform at least one of the steps of the device discovery method 116.

In a forgoing manner, a profile management method 100 and profile management system 24 are described according to exemplary embodiments of the invention. Although only a number of embodiments of the invention are disclosed in this document, it will be apparent to one skilled in the art in view of this disclosure that numerous changes and/or modifications can be made to the disclosed embodiments without departing from the scope and spirit of the invention.

In some embodiments, a control setting may be built for the various haptic features that are controllable by the user. These features allow the user to customize the haptic features so that each user can have their unique haptic profile. In some embodiments, the haptic profile may be part of the configuration data 36 described above with reference to FIGS. 1-5.

In some embodiments, the intensity of the haptic may be customized in the haptic profile. This allows the user to control the intensity of the haptic effects.

In some embodiments, the haptic frequency may be customized in the haptic profile. In some embodiments, the haptic effects may be determined by the audio signature. In some embodiments, the haptic effects may be control by a dedicated haptic signal. The audio signature of a shotgun is different from the audio signature of the bomb explosion. Similarly, the audio signature of a car driving pass and a speedboat speeding pass are different. By adjusting frequency of the audio signature, the user may be allowed to emphasis certain haptics. In some embodiments, an audio equalizer like interface may be set up for user to control the haptic frequency.

In some embodiments, predetermined haptic use case may be customized in the haptic profile. Certain use cases, such as Gaming, Movie, Music . . . etc., may be predetermined so that users may quickly switch to those use cases that they feel work best for certain scenarios.

In some embodiments, audio channel for generating haptics may be customized in the haptic profile. Certain games/movies may have different audio setups—2.0 Stereo setup, 5.1/7.1/9.1 surround setup, and even different Dolby Atmos or DTS (Digital Theater Systems) surround platform. This provides the option for the user to select which kind of audio to use. To provide deeper customization, users may even control each individual audio channel of the surround setup and direct which audio channel is being send to the device. By way of example, two-channel audio system 2.0/2.1 can be upmixed to 5.1/7.1 audio before being split to various haptic channels, or 5.1/7/1 audio system can be downmixed to 2.0/2.1 before being split to various haptic channels.

In some embodiments, power saving may be customized in the haptic profile. Certain haptic actuator may need a startup time before it can start vibrating. Therefore, power may need to be constantly delivered to the actuator. However, if the user is not using the device, the haptic device can actually stop delivering power to the actuator. A simple option is to provide user with an on/off switch. A user may be provided with smart options—by using a solution (e.g., a proximity sensor) to determine whether the user is using the device. Another option is to cut off power when the device is not being used for a predetermined period.

In some embodiments, auto detection of application may be included in the haptic profile. This may allow haptic effect profile to be change based on the application that is currently running on the system. For example, if the user is playing Overwatch, the system may automatically switch to the Overwatch profile. If the user switches to play music on his Spotify, his Overwatch profile may automatically switch over to his Spotify profile. In some embodiments, user may be able to overwrite any predetermined profile by using the control application running on the system.

In some embodiments, all the customization features described above may be saved on the system or upload on the cloud. Any changes made may be automatically uploaded onto the cloud or save on the system. Each individual actuator may be individually controlled or controlled as one or more groups if there are more than one actuator.

Figure 6:
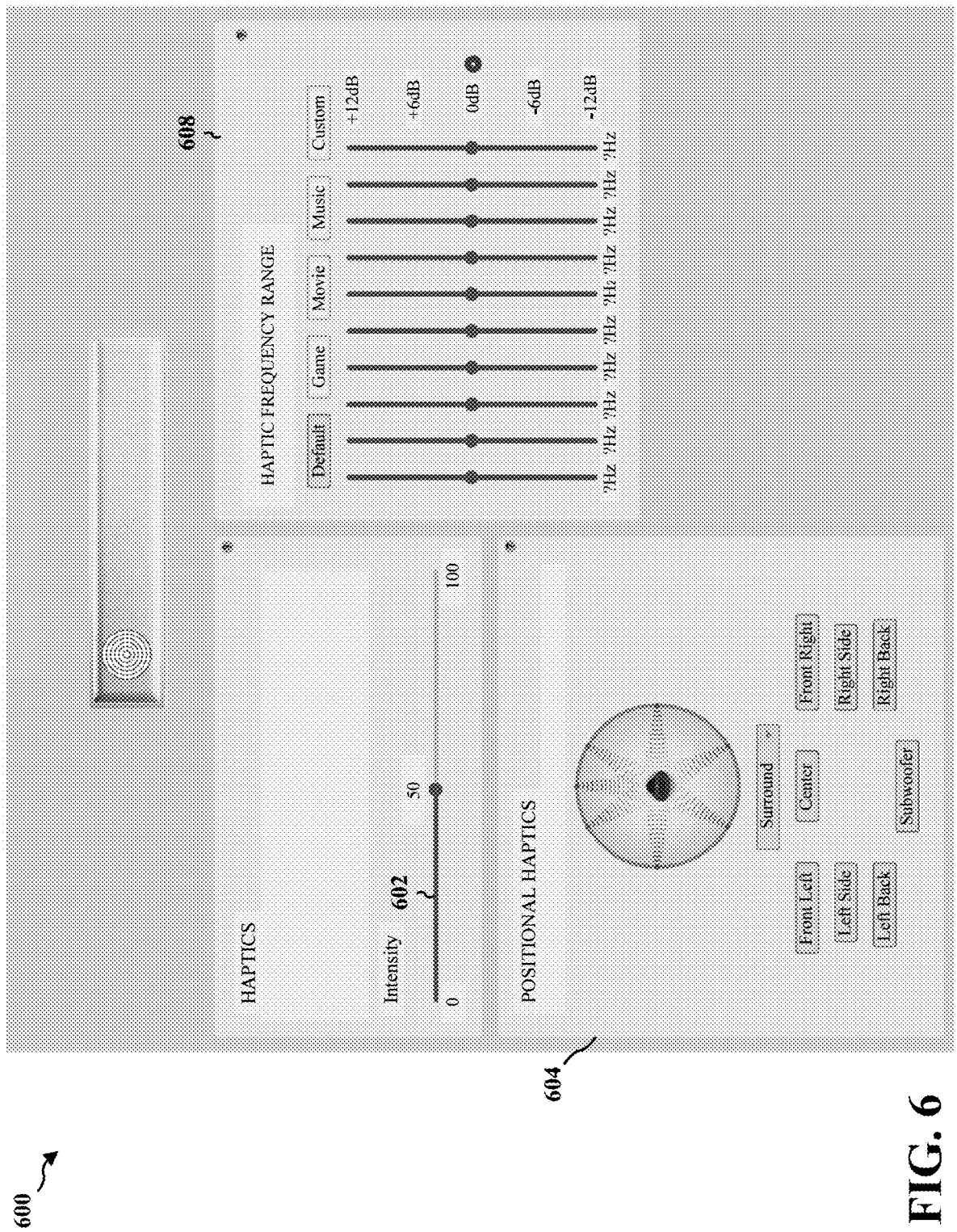
FIG. 6 is a diagram illustrating an example of a user interface for configuring a haptic profile with 7.1 audio surround channels.

FIG. 6 is a diagram illustrating an example of a user interface 600 for configuring a haptic profile with 7.1 audio surround channels. In the example, a user may use user interface (UI) item 602 to customize the intensity of the haptics. The UI item 604 allows the user to pick up specific audio channels for a more immersive experience. The UI item 608 allow the user to customize a range of frequency haptics can be felt.

Figure 7:
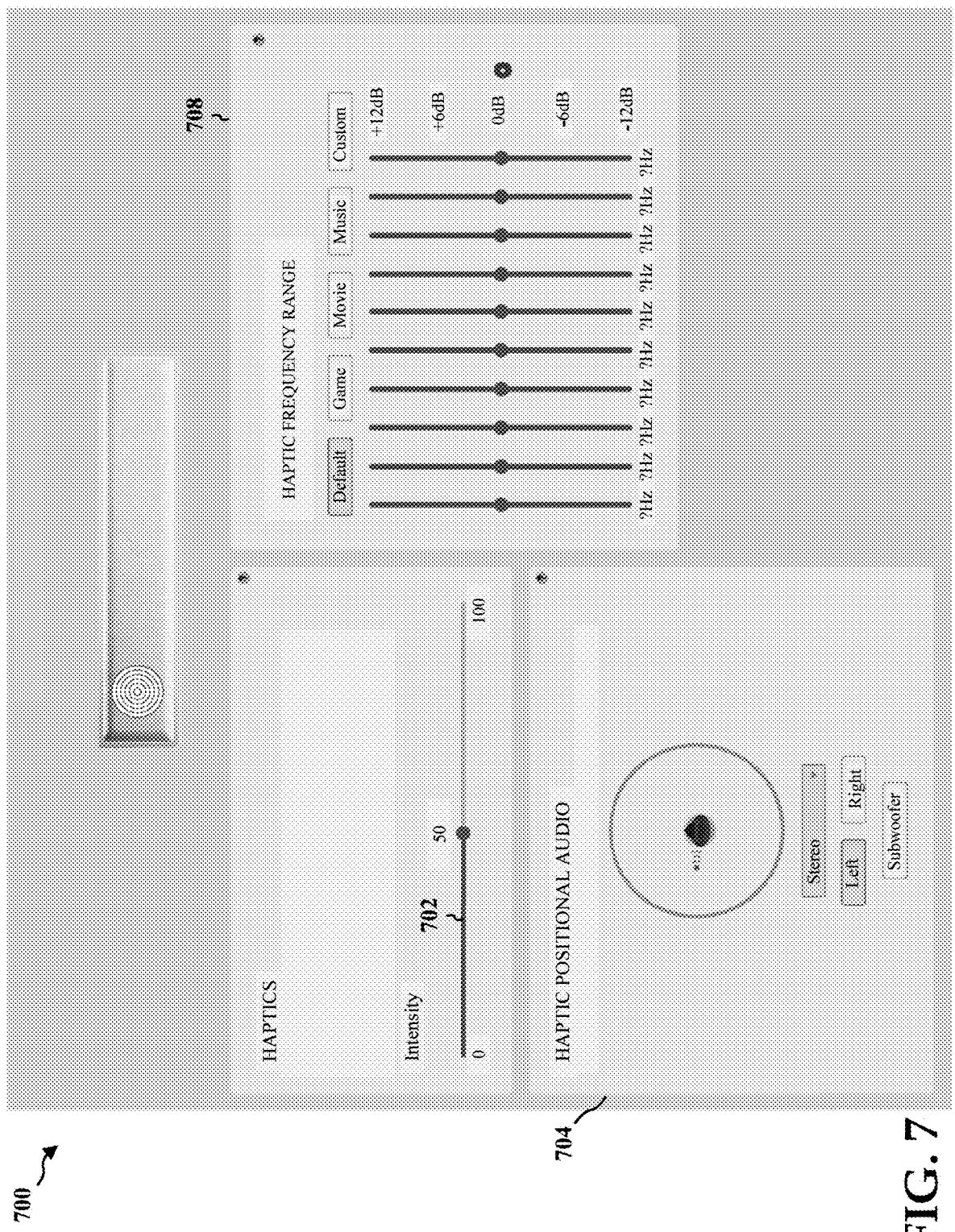
FIG. 7 is a diagram illustrating an example of a user interface for configuring a haptic profile with 2.0/2.1 stereo audio channels.

FIG. 7 is a diagram illustrating an example of a user interface 700 for configuring a haptic profile with 2.0/2.1 stereo audio channels. In the example, a user may use UI item 702 to customize the intensity of the haptics. The UI item 704 allows the user to pick up specific audio channels for a more immersive experience. The UI item 708 allow the user to customize a range of frequency haptics can be felt.

Haptic devices can provide physical sensations to the users who contact the haptic devices. Typically, one or more motors or other actuators are built inside the haptic devices and are controlled by a processor or the controlling computer system. The computer system controls the vibration forces by sending control signals to the actuators of the corresponding haptic devices.

Typically, haptic feedback is provided to the user via only one haptic device such as a haptic mouse. The user must contact the mouse to feel the haptic feedback. Thus, there are numerous times when the user is not experiencing haptic feedback when the user's hand is not touching the mouse.

In some embodiments, this problem may be solved via a haptic ecosystem that allows the user to experience haptic feedback through a plurality of devices that communication with an audio system. By way of example, many gaming software such as first-person-shooter games, uses multi-channel audio stream to deliver surround sound effect for immersive gaming. The gaming sounds that appear during the game such as explosions, gunshots, etc. can be embedded into the audio channels according to the direction where the sounds originated. In some embodiments, the gaming experience may be enhanced further by creating haptic vibrations to emulate real time effects such as explosions, weapon recoil actions, heavy footsteps, etc.

In some embodiments, the audio signals from the multi-channel audio stream may be used to create haptic vibrations in gaming devices that have surface contact with sensitive parts of a gamer's body such as palm, wrist, cheek, back and buttocks. The haptic vibration may be created in the gaming devices with specific audio to haptics algorithms.

Specific examples of device providing haptic vibration provided by particular embodiments of the present disclosure are described below. However, it will be understood that the scope of the present disclosure is not limited in any way by the examples described below. Gaming ecosystem as described below may also be describing about a network of audio visual entertainment system. The examples provided are solely for aiding or enabling the reader to have a better understanding and/or appreciation of particular embodiments of the present disclosure.

In some embodiments, multi-channel audio may be used to create haptics on gaming devices. In such embodiments, audio channels may be extracted from multi-channel audio stream, the haptic signals may be computed from the audio channel signals, and the computed haptic signals may be directed to drive the haptic devices in the gaming ecosystem. The haptic devices in a typical gaming ecosystem may include keyboard, mouse, chair, and headset. However, other types of devices with haptic vibration may also be implemented in the gaming ecosystem. Each of these devices in the haptic ecosystem transfers haptic vibration to different parts of the gamer's body. To create the best gaming experience with the haptic effect, appropriate arithmetic to the input audio channels may be applied before the resulting haptic signal is sent to each haptic device in the ecosystem. Table 1 presents an example of the arithmetic summation of the audio signals from a 7.1 audio stream that would be applied before the computed signals (e.g., as haptic signals) are directed to different devices in the gaming ecosystem. Each of G1, G2, G3, G4, G5 represents a scaling factor that applies to a respective arithmetic summation of the audio signals in order to generate a corresponding haptic signal.

TABLE 1

An example of the haptic signals computation for a set of haptic devices using legacy 7.1 multi-channel audio stream

| S/N | Haptic device | Computed Signal, Fn (Ch[1 . . . 8]) |
|---|---|---|
| 1 | Keyboard Wrist-rest | (Left) × G1 |
| 2 | Mouse | (Right) × G2 |
| 3 | Headset | (Left + Right + Center) × G3 |
| 4 | Chair Back | (Surround Left + Surround Right + Rear Left + Rear Right) × G4 |
| 5 | Chair Seat | Subwoofer × G5 |

Figure 8:
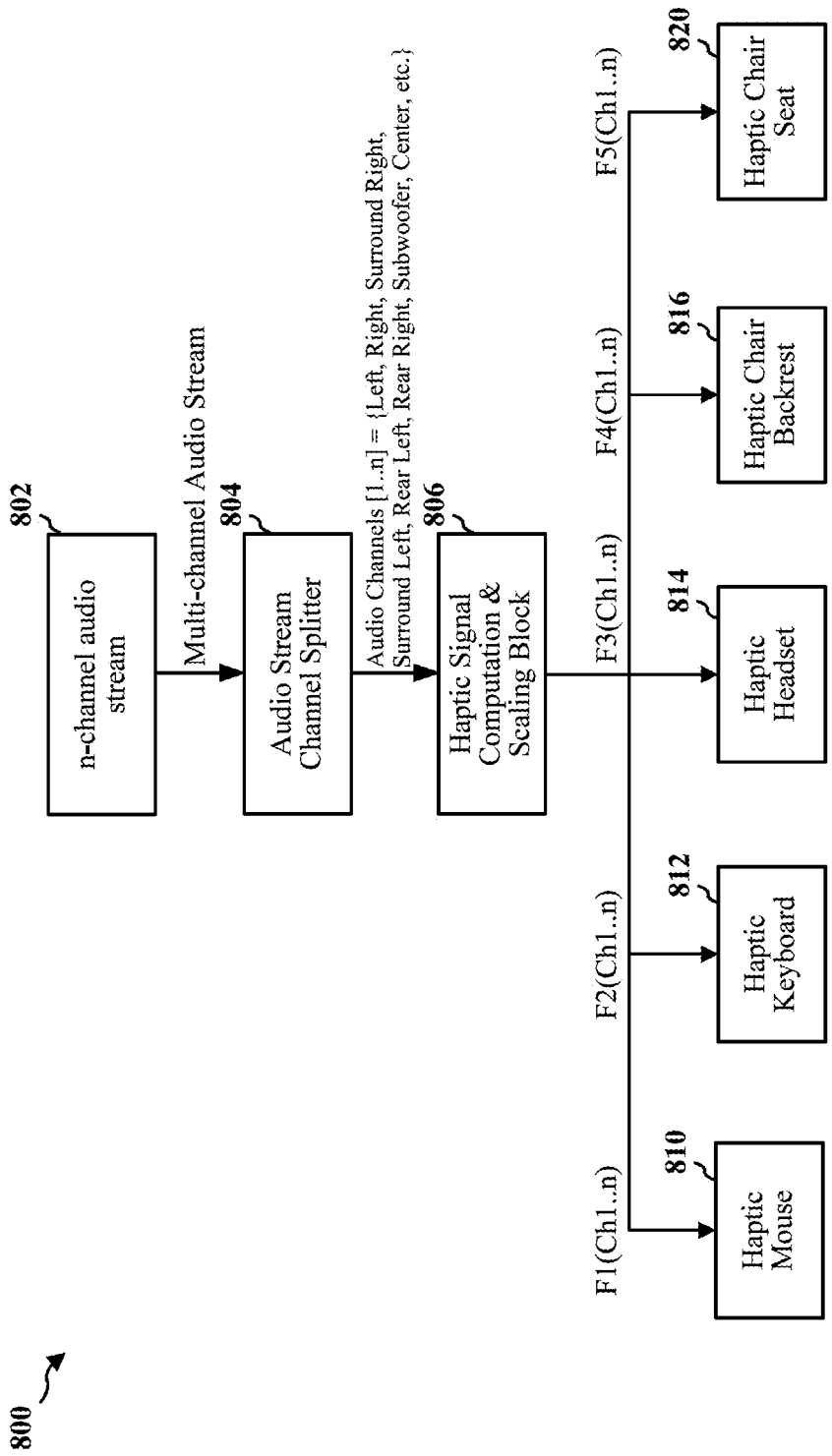
FIG. 8 is a functional block diagram illustrating an example of providing haptic feedback with standard multi-channel audio in a haptic ecosystem.

FIG. 8 is a functional block diagram 800 illustrating an example of providing haptic feedback with standard multi-channel audio in a haptic ecosystem. In the example, the haptic ecosystem includes an audio stream splitter 804, a haptic signal computation and scaling block 806, a haptic mouse 810, a haptic keyboard 812, a haptic headset 814, a haptic chair backrest 816, and a haptic chair seat 820.

In some embodiments, the audio stream channel splitter 804 takes in the multi-channel audio stream such as n-channels audio stream 802 and split the stream into individual audio channels or tracks, i.e., Left, Right, Surround Right, Surround Left, Rear Left, Rear Right, Subwoofer, Center for a typical 7.1 audio stream.

In some embodiments, the haptic signal computation and scaling block 806 takes in "n" number of audio channels and compute the haptic signals that would be sent to each of the haptic devices in the gaming eco-system. The haptic signals are calculated from the input audio channels and scaled or amplified by suitable scaling factor (e.g., as described above in Table 1). In some embodiments, the computation for the haptic signal sent to each haptic device may be customized based on the type of device, position of the device with respect to the gamer, and also the type of game or characters in the game.

Figure 9:
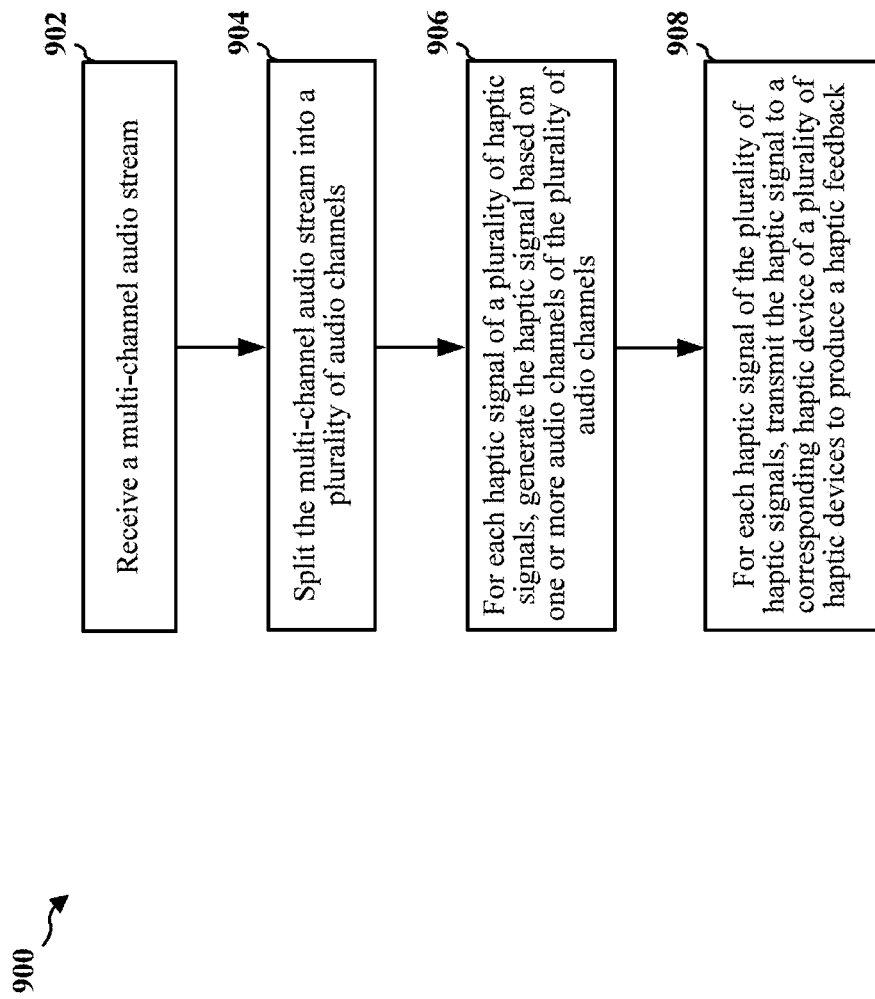
FIG. 9 is a flowchart of a method of providing haptic feedback through a plurality of haptic devices.

FIG. 9 is a flowchart 900 of a method of providing haptic feedback through a plurality of haptic devices. The method may be performed by an apparatus (e.g., apparatus 1302/1302' described below with reference to FIG. 13 or 14). In some embodiments, the plurality of haptic devices may include one or more of a keyboard, a computer mouse, a chair backrest, a chair seat, or a headset. In some embodiments, the operations performed in the method may correspond to operations described above in FIG. 8.

At 902, the apparatus may receive a multi-channel audio stream. At 904, the apparatus may split the multi-channel audio stream into a plurality of audio channels.

At 906, for each haptic signal of a plurality of haptic signals, the apparatus may generate the haptic signal based on one or more audio channels of the plurality of audio channels. In some embodiments, to generate the haptic signal, the apparatus may perform one of scaling or amplifying on the one or more audio channels by a corresponding scaling factor to generate the haptic signal.

In some embodiments, to generate the haptic signal, the apparatus may customize the computation of the haptic signal based on one or more of the type of the corresponding haptic device, or the position of the corresponding haptic device with respect to the user of the corresponding haptic device. In some embodiments, to generate the haptic signal, the apparatus may customize the computation of the haptic signal based on one or more of the type of the electronic game associated with the multi-channel audio stream, or characters in the electronic game associated with the multi-channel audio stream.

At 908, for each haptic signal of the plurality of haptic signals, the apparatus may transmit the haptic signal to a corresponding haptic device of a plurality of haptic devices to produce a haptic feedback.

The embodiments described above with reference to FIGS. 8 and 9 may have limitations because the haptic signals are derived from audio channels that provide audible effects to the gamers. It is not possible for the system to selectively vibrate to certain sound, such as to vibrate on sound from gunshot created by the gamer but not to gunshot of opponents in the game.

To further enhance the haptic effect, some embodiments incorporate dedicated audio-based haptic channels into the multi-channel audio stream where the haptic channels contain only sound for haptic effect and haptic metadata. Such embodiments may need content owner to create dedicated haptic channels in the multi-channel audio streams. Each haptic channel may be dedicated to drive one haptic device in the gaming ecosystem. The data bit rate of the haptic channels may be much lower as compared to audio channels because haptic actuators have low frequency response (e.g., not more than 1 kHz).

Figure 10:
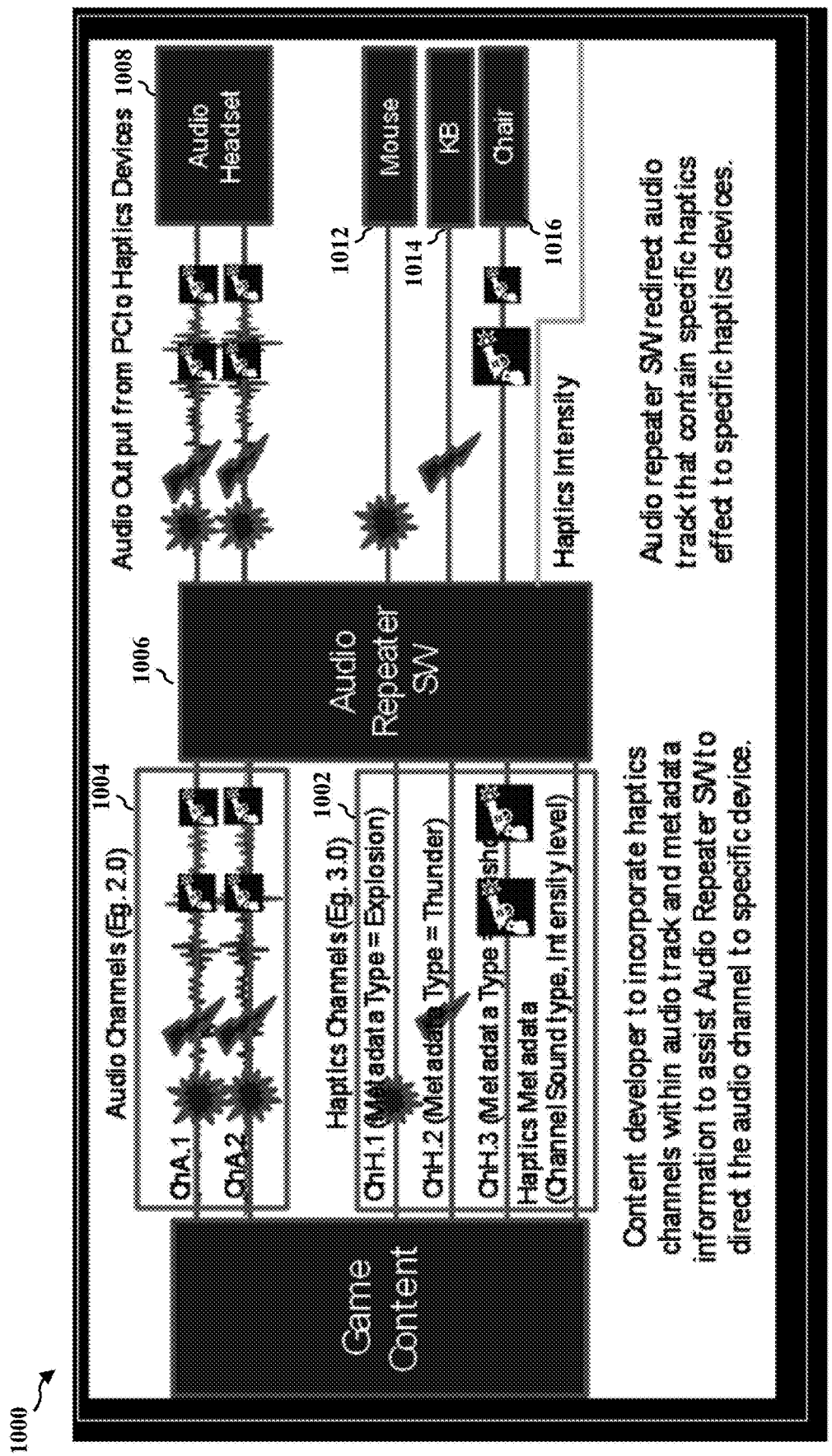
FIG. 10 is a diagram illustrating an example of haptic channels implementation in a haptic ecosystem.

FIG. 10 is a diagram 1000 illustrating an example of haptic channels implementation in a haptic ecosystem. In the example, three haptic channels 1002 are interleaved with two audio channels 1004. In some embodiments, each of the haptic channels 1002 may include one or more audio tracks that contain specific haptic effect to a specific haptic device. In some embodiments, content developer may incorporate haptic channels and metadata information within audio track. The metadata information may include channel sound type and/or intensity level, and may be used to assist audio repeater software 1006 to direct each haptic channel to specific haptic device. The audio repeater software 1006 may direct the audio channels 1004 to the audio headset 1008, and each of the haptic channels 1002 to a respect haptic device (e.g., one of mouse 1012, keyboard 1014, and chair 1016).

Figure 11:
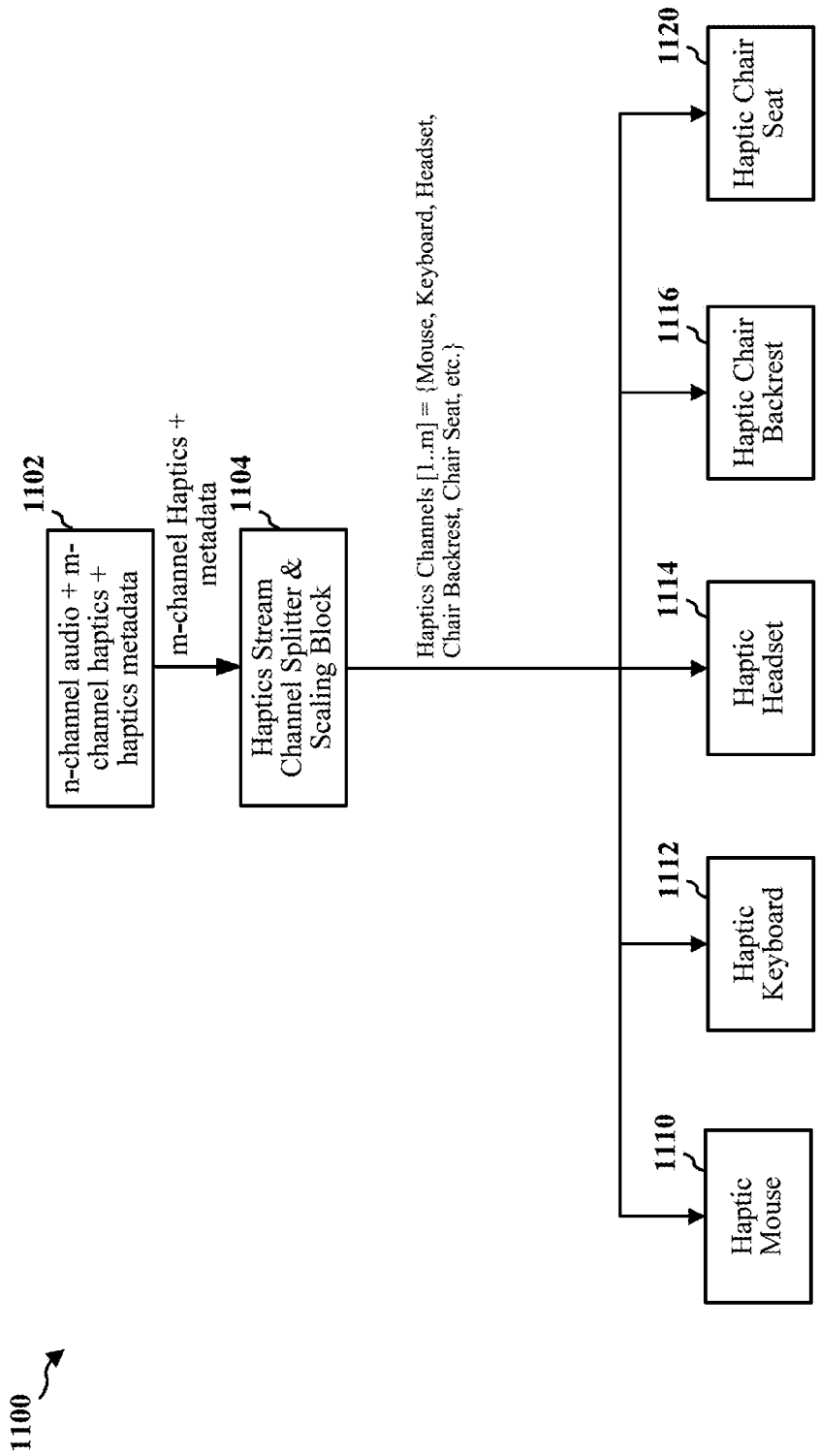
FIG. 11 is a functional block diagram illustrating an example of providing haptic feedback with multi-channel audio-based haptic channels in a haptic ecosystem.

FIG. 11 is a functional block diagram 1100 illustrating an example of providing haptic feedback with multi-channel audio-based haptic channels in a haptic ecosystem. In the example, the haptic ecosystem includes a haptics stream channel splitter and scaling block 1104, a haptic mouse 1110, a haptic keyboard 1112, a haptic headset 1114, a haptic chair backrest 1116, and a haptic chair seat 1120.

In some embodiments, the haptics stream channel splitter and scaling block 1104 takes in m haptic channels and metadata derived from a media stream 1102 that includes n audio channels, m haptic channels, and haptics metadata. The haptics stream channel splitter and scaling block 1104 may direct each of the m haptic channels to a respective haptic device based on the metadata.

In some embodiments, haptic sound may be authored by the content owner specifically to create the desired haptic effect for each device in the gaming ecosystem and embed the sound into dedicated haptic channel. The sound effect for a specific haptic device would not be mixed with other sound such as background music or other sound effect for another haptic device. These haptic sound channels may be interleaved with the conventional audio channels that would co-exist with the haptic channels in the stream. In another example, the content owner sends out haptic signals to the haptic system, which further interprets the haptic signal and extract the appropriate audio signal from the haptic signal. In this way, all audio signals are extracted from the haptic signal.

Some embodiments may have a haptic metadata interpreter block (e.g., contained within the haptics stream channel splitter and scaling block 1104) that would interpret the metadata and redirect the haptic channels to the appropriate haptic devices based on the metadata information. The haptic metadata may consist of static metadata and dynamic metadata. The static metadata may provide information such as the sound type, the recommended device that should receive this signal and the position where the haptic vibration should be generated. The dynamic metadata may provide information such as relative intensity level. The system does not need to compute the haptic signal and extract the sound effect from background sound. Based on the static metadata information of the channel, the system may decide which device in the ecosystem would receive the channel signal.

In some embodiments, instead of creating dedicated haptic channel for each haptic device/effect, a dedicated haptic data signal may deliver all haptic metadata information from the video stream to the haptic interpreter engine (e.g., contained within the haptics stream channel splitter and scaling block 1104). The haptic interpreter engine may decode the various haptic metadata information and deliver a relevant haptic data to at least one of a network of haptic devices. Based on the relevant haptic data, the at least one of a network of haptic devices may simulate the haptic effects.

The haptic metadata information might be based on an application programming interface (API) or software development kit (SDK) that contain preconfigured haptic effects, or configurable haptic effects by content providers.

To further complement the embodiments described above, the haptic interpreter engine may implement machine learning (ML) to understand the video content and identifies the haptic effects that are happening on the screen. In addition, the ML solution may locate the haptic effects that are happening on the video content while recognizing the haptic devices that the user is using to intelligently replicate the haptic effects. For example: ML may identify if the user is using two haptic devices and direct the correct haptic channels or combined various haptic channels for just those two haptic devices.

By way of example, ML may be able to identify all the various haptic motors or actuators used in the haptic device and adjust the correct intensity of the actuators to accurately replicate the haptic effects. In one example embodiment, the user may manually override the settings provided by ML through a haptic profile setting software. In some embodiments, haptic signals may manage actuator behaviour in real time.

Particular embodiments of the disclosure are described above for addressing at least one of the previously indicated problems. While features, functions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed structures, features and functions, or alternatives thereof, may be desirably combined into other different devices, systems, or applications.

Figure 12:
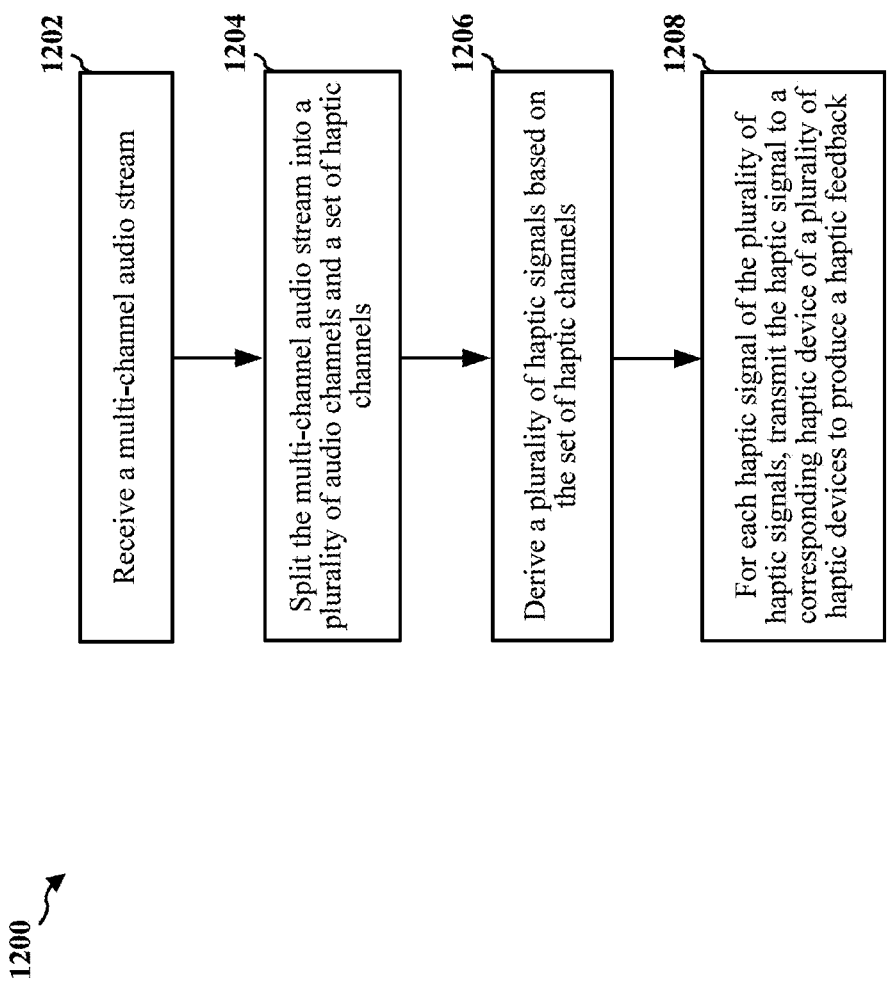
FIG. 12 is a flowchart of a method of providing haptic feedback through a plurality of haptic devices.

FIG. 12 is a flowchart 1200 of a method of providing haptic feedback through a plurality of haptic devices. The method may be performed by an apparatus (e.g., apparatus 1302/1302' described below with reference to FIG. 13 or 14). In some embodiments, the operations performed in the method may correspond to operations described above with reference to FIGS. 10 and 11. In some embodiment, the plurality of haptic devices may include one or more of a keyboard, a computer mouse, a chair backrest, a chair seat, or a headset. At 1202, the apparatus may receive a multi-channel audio stream.

At 1204, the apparatus may split the multi-channel audio stream into a plurality of audio channels and a set of haptic channels. In some embodiments, each haptic channel of the set of haptic channels may include sound for haptic effect and haptic metadata. In some embodiment, for each haptic channel of the set of haptic channels, the apparatus may determine a corresponding haptic device based on the haptic metadata contained within the haptic channel. In some embodiment, the set of haptic channels are extracted from sound frequencies that are beyond the human hearing range of the multi-channel audio stream.

In some embodiments, haptic metadata may include static metadata and dynamic metadata. The static metadata may include one or more of the sound type, the recommended haptic device for receiving a haptic signal corresponding to the haptic channel, or a position where haptic vibration should be generated. The dynamic metadata may include relative intensity level of the corresponding haptic signal.

In some embodiments, each haptic channel of the set of haptic channels may be dedicated to drive one haptic device of the plurality of haptic devices. In some embodiments, the data bit rate of the set of haptic channels may be lower than the data bit rate of the plurality of audio channels.

At 1206, the apparatus may derive a plurality of haptic signals based on the set of haptic channels. In some embodiments, each haptic signal may come directly from a corresponding haptic channel (e.g., contained in the haptic channel). In some embodiments, the audio signal contained in the haptic channel may be processed (e.g., scaling, conversion, merge, summation, etc.) to generate the haptic signal. In some embodiments, the set of haptic channels may include a dedicated haptic data signal, where the plurality of haptic signals may be derived from haptic metadata information in the dedicated haptic data signal.

At 1208, for each haptic signal of the plurality of haptic signals, the apparatus may transmit the haptic signal to a corresponding haptic device of the plurality of haptic devices to produce the haptic feedback.

Figure 13:
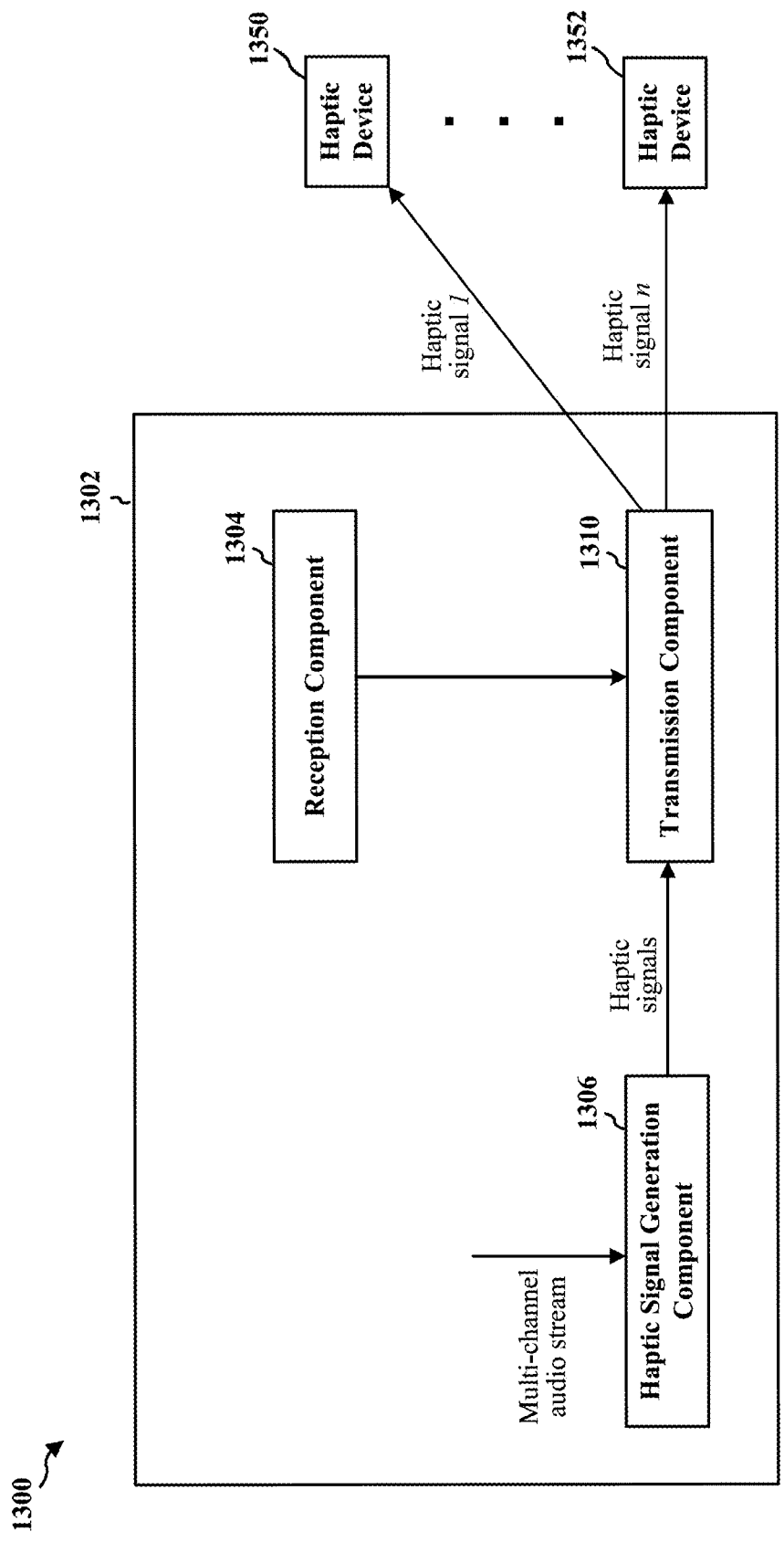
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. In some embodiments, the apparatus 1302 may be one or more computing devices. The apparatus 1302 may include a reception component 1304 that receives data from another device.

The apparatus 1302 may include a transmission component 1310 that transmits haptic signals 1-n to haptic devices 1350-1352. In some embodiments, each of the haptic device 1350-1352 may be coupled to the apparatus 1302 via a wired or wireless connection. Therefore, the haptic signals may be transmitted to the haptic devices through wired or wireless communication. In some embodiments, the transmission component 1310 may perform the operations described above with reference to 908 in FIG. 9 or 1208 in FIG. 12. The reception component 1304 and the transmission component 1310 may collaborate to coordinate the communication of the apparatus 1302.

The apparatus 1302 may include a haptic signal generation component 1306 that is configured to generate haptic signals based on a multi-channel audio stream. In one embodiment, the haptic signal generation component 1306 may perform the operations described above with reference to 904 or 906 in FIG. 9, or 1204 or 1206 in FIG. 12.

The apparatus 1302 may include additional components that perform each of the blocks of the algorithm in the aforementioned flowcharts of FIGS. 9 and 12. As such, each block in the aforementioned flowcharts of FIGS. 9 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
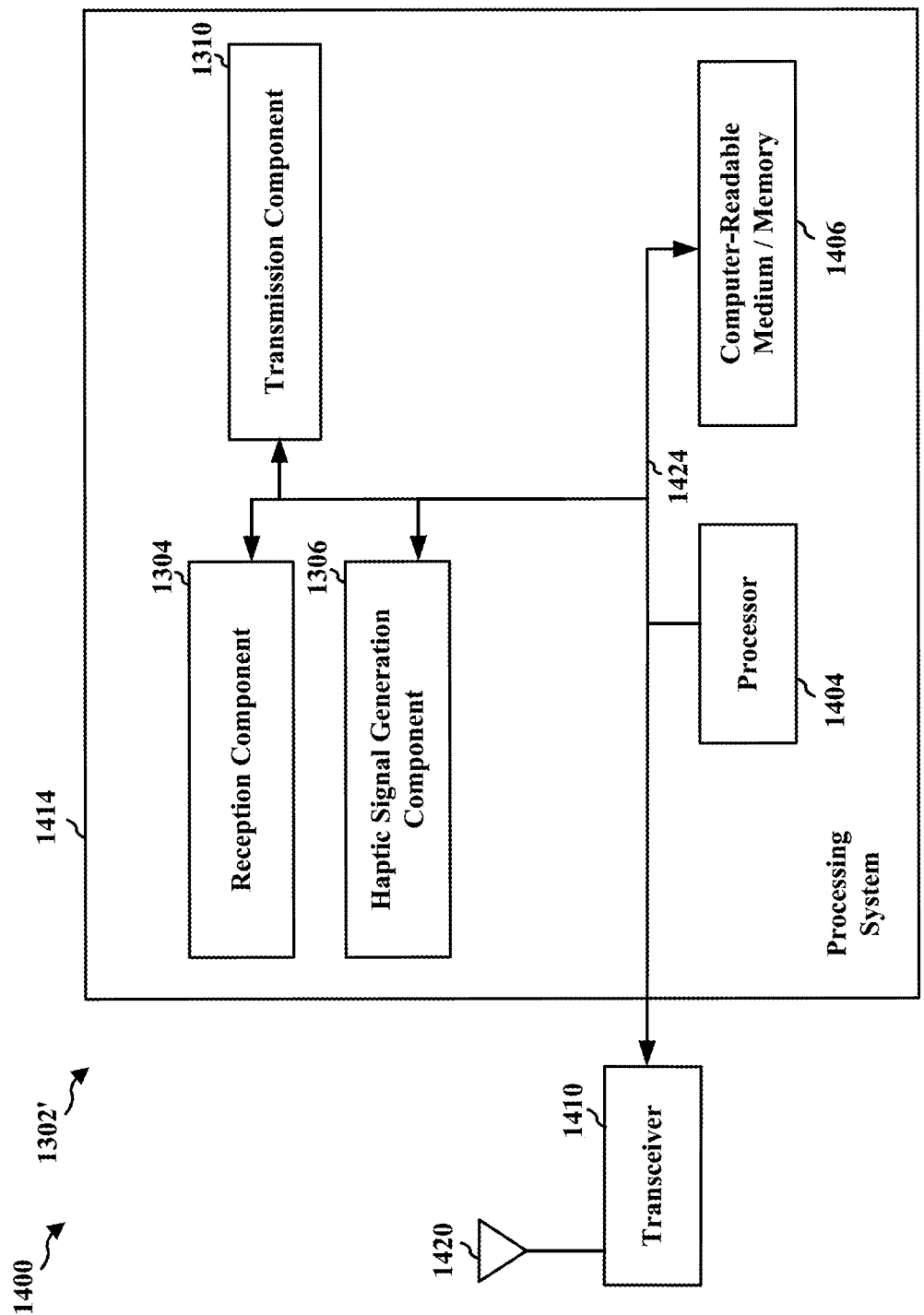
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. In one embodiment, the apparatus 1302' may be the apparatus 1302 described above with reference to FIG. 13. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420.

The processing system 1414 includes a processor 1404 coupled to a computer-readable medium/memory 1406. The processor 1404 is responsible for general processing, including the analyzation of data gathered by the apparatus itself through its own sensors and the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1310. The components may be software components running in the processor 1404, resident/stored in the computer readable medium/memory 1406, one or more hardware components coupled to the processor 1404, or some combination thereof.

In the following, various aspects of this disclosure will be illustrated:

Example 1 is a profile management method comprising: receiving client data provided by a computing system, the client data comprising device data being descriptive of a user-interface (UI) in signal communication with the computing system, the device data being further descriptive of the user interactions identifiable by the UI; associating one of a plurality of device profiles with the device data, each of the plurality of device profiles having configuration data associated therewith; and providing the configuration data associated with the one of the plurality of device profiles to the computing system for configuring operation of the UI with the computing system in response to at least a portion of the user interactions identifiable by the UI.

In example 2, the subject matter of example 1 can optionally include that the UI is one of a computer peripheral coupled with an interface formed integral with the computing device.

In example 3, the subject matter of example 1 can optionally include that the UI is at least one of actuation, touch, light, sound, motion and position sensing.

In example 4, the subject matter of example 1 can optionally include that the client data further comprises identifier data being indicative of the user interactions being identifiable by the UI.

In example 5, the subject matter of example 4 can optionally include that associating one of a plurality of device profiles with the device data comprises: associating one of a plurality of user identifiers with the identifier data, each of the plurality of identifier data having at least one of the plurality of device profiles associated therewith; and associating the device data with one of the plurality of device profiles associated with the one of the plurality of user identifiers associated with the identifier data.

In example 6, the subject matter of example 4 can optionally include receiving authentication data from the computing system; and authenticating the identifier data using the authentication data, wherein the configuration data is provided to the computing system in response to the identifier data being authenticated.

In example 7, the subject matter of example 1 can optionally include that the configuration data substantially defines interactions between the UI and at least one of an application and an operating platform operating on the computing system.

In example 8, the subject matter of example 1 can optionally include that providing the configuration data associated with the one of the plurality of device profiles to the computing system comprises: processing the configuration data for compliance with an operating platform, the client data comprising a platform data describing the operating platform.

Example 9 is a profile management system comprising: a controller module for receiving client data provided by a computing system, the client data comprising device data being descriptive of a user-interface (UI) in signal communication with the computing system, the device data being further descriptive of the user interactions identifiable by the UI; a storage module having stored thereon a plurality of device profiles, each of the plurality of device profiles having configuration data associated therewith; a processor module for associating one of a plurality of device profiles stored on the storage module with the device data, wherein the configuration data associated with the one of the plurality of device profiles is providable by the controller module to the computing system for configuring operation of the UI with the computing system in response to at least a portion of the user interactions identifiable by the UI.

In example 10, the subject matter of example 9 can optionally include that the UI is one of a computer peripheral coupled with an interface formed integral with the computing device.

In example 11, the subject matter of example 10 can optionally include that the UI is at least one of actuation, touch, light, sound, motion and position sensing.

In example 12, the subject matter of example 9 can optionally include that the client data further comprises identifier data being indicative of the user interactions being identifiable by the UI.

In example 13, the subject matter of example 12 can optionally include that the processor module is further configured to associate one of a plurality of user identifiers with the identifier data, each of the plurality of identifier data having at least one of the plurality of device profiles associated therewith; and associating the device data with one of the plurality of device profiles associated with the one of the plurality of user identifiers associated with the identifier data.

In example 14, the subject matter of example 12 can optionally include an authentication module for receiving authentication data from the computing system; and authenticating the identifier data using the authentication data, wherein the configuration data is provided to the computing system in response to the identifier data being authenticated.

In example 15, the subject matter of example 9 can optionally include that the configuration data substantially defines interactions between the UI and at least one of an application and an operating platform operating on the computing system.

In example 16, the subject matter of example 9 can optionally include that the processor module is further configured to process the configuration data for compliance with an operating platform, the client data comprising a platform data describing the operating platform.

Example 17 is a machine readable medium having stored therein a plurality of programming instructions, which when executed, the instructions cause the machine to: receive client data provided by a computing system, the client data comprising device data being descriptive of a user-interface (UI) in signal communication with the computing system, the device data being further descriptive of the user interactions identifiable by the UI; associate one of a plurality of device profiles with the device data, each of the plurality of device profiles having configuration data associated therewith; and provide the configuration data associated with the one of the plurality of device profiles to the computing system for configuring operation of the UI with the computing system in response to at least a portion of the user interactions identifiable by the UI.

In example 18, the subject matter of example 17 can optionally include that the UI is one of a computer peripheral coupled with and an interface formed integral with the computing device.

In example 19, the subject matter of example 17 can optionally include that the UI is at least one of actuation, touch, light, sound, motion and position sensing.

In example 20, the subject matter of example 17 can optionally include that the client data further comprises identifier data being indicative of the user interactions being identifiable by the UI.

In example 21, the subject matter of example 20 can optionally include that the plurality of programming instructions, when executed, cause the machine to: associate one of a plurality of device profiles with the device data comprising: associate one of a plurality of user identifiers with the identifier data, each of the plurality of identifier data having at least one of the plurality of device profiles associated therewith; and associate the device data with one of the plurality of device profiles associated with the one of the plurality of user identifiers associated with the identifier data.

In example 22, the subject matter of example 20 can optionally include receiving authentication data from the computing system; and authenticating the identifier data using the authentication data, wherein the configuration data is provided to the computing system in response to the identifier data being authenticated.

In example 23, the subject matter of example 17 can optionally include that the configuration data substantially defines interactions between the UI and at least one of an application and an operating platform operating on the computing system.

In example 24, the subject matter of example 17 can optionally include that the plurality of programming instructions, when executed, cause the machine to: process the configuration data for compliance with an operating platform, the client data comprising a platform data describing the operating platform.

Example 25 is a method or apparatus for providing haptic feedback through a plurality of haptic devices. The apparatus may receive a multi-channel audio stream. The apparatus may split the multi-channel audio stream into a plurality of audio channels. For each haptic signal of a plurality of haptic signals, the apparatus may generate the haptic signal based on one or more audio channels of the plurality of audio channels. For each haptic signal of the plurality of haptic signals, the apparatus may transmit the haptic signal to a corresponding haptic device of the plurality of haptic devices to produce the haptic feedback.

In example 26, the subject matter of example 25 may optionally include that the plurality of haptic devices may include one or more of a keyboard, a computer mouse, a chair backrest, a chair seat, or a headset.

In example 27, the subject matter of any one of examples 25 to 26 may optionally include that, to generate the haptic signal, the apparatus may perform one of scaling or amplifying on the one or more audio channels by a corresponding scaling factor to generate the haptic signal.

In example 28, the subject matter of any one of examples 25 to 27 may optionally include that, to generate the haptic signal, the apparatus may customize the computation of the haptic signal based on one or more of the type of the corresponding haptic device, or the position of the corresponding haptic device with respect to a user of the corresponding haptic device.

In example 29, the subject matter of any one of examples 25 to 28 may optionally include that, to generate the haptic signal, the apparatus may customize the computation of the haptic signal based on one or more of the type of an electronic game associated with the multi-channel audio stream, or characters in the electronic game associated with the multi-channel audio stream.

Example 30 is a method or apparatus for providing haptic feedback through a plurality of haptic devices. The apparatus may receive a multi-channel audio stream. The apparatus may split the multi-channel audio stream into a plurality of audio channels and a set of haptic channels. The apparatus may derive a plurality of haptic signals based on the set of haptic channels. For each haptic signal of the plurality of haptic signals, the apparatus may transmit the haptic signal to a corresponding haptic device of the plurality of haptic devices to produce the haptic feedback.

In example 31, the subject matter of example 30 may optionally include that the plurality of haptic devices may include one or more of a keyboard, a computer mouse, a chair backrest, a chair seat, or a headset.

In example 32, the subject matter of any one of examples 30 to 31 may optionally include that each haptic channel of the set of haptic channels may include sound for haptic effect and haptic metadata.

In example 33, the subject matter of example 32 may optionally include that, for each haptic channel of the set of haptic channels, the apparatus may determine a corresponding haptic device based on the haptic metadata contained within the haptic channel.

In example 34, the subject matter of any one of examples 32 to 33 may optionally include that the haptic metadata may include static metadata and dynamic metadata.

In example 35, the subject matter of example 34 may optionally include that the static metadata may include one or more of a sound type, a recommended haptic device for receiving a haptic signal corresponding to the haptic channel, or a position where haptic vibration should be generated.

In example 36, the subject matter of any one of examples 34 to 35 may optionally include that the dynamic metadata may include relative intensity level.

In example 37, the subject matter of any one of examples 30 to 36 may optionally include that each haptic channel of the set of haptic channels may be dedicated to drive one haptic device of the plurality of haptic devices.

In example 38, the subject matter of any one of examples 30 to 37 may optionally include that the data bit rate of the set of haptic channels may be lower than the data bit rate of the plurality of audio channels.

In example 39, the subject matter of any one of examples 30 to 38 may optionally include that the set of haptic channels may include a dedicated haptic data signal, where the plurality of haptic signals may be derived from haptic metadata information in the dedicated haptic data signal.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of providing haptic feedback through a plurality of different types of haptic devices, the method comprising:
   receiving a multi-channel audio stream containing a plurality of sound effects;
   for each type of haptic device of the plurality of different types of haptic devices, associating the type of haptic device with a unique sound effect from the plurality of sound effects that is different from a remainder of the plurality of sound effects;
   splitting the multi-channel audio stream into a plurality of audio channels;
   for each haptic signal of a plurality of haptic signals, generating the haptic signal based on one or more audio channels of the plurality of audio channels and a respective unique sound effect associated with a respective type of haptic device, and transmitting the haptic signal to the respective type of haptic device to produce the haptic feedback;
   wherein the generating of the haptic signal based on the split audio channels and the respective unique sound effect comprises customizing a computation of the haptic signal based on the type of haptic device.

2. The method of claim 1, wherein the plurality of different types of haptic devices comprises a keyboard and a computer mouse.

3. The method of claim 1, wherein the generating of the haptic signal comprises performing one of scaling or amplifying on the one or more audio channels by a corresponding scaling factor to generate the haptic signal.

4. The method of claim 1, wherein the generating of the haptic signal further comprises customizing the computation of the haptic signal based on a position of the respective type of haptic device with respect to a user of the haptic device.

5. The method of claim 1, wherein the generating of the haptic signal further comprises customizing the computation of the haptic signal based on one or more of a type of an electronic game associated with the multi-channel audio stream, or characters in the electronic game associated with the multi-channel audio stream.

6. A method of providing haptic feedback through a plurality of haptic devices, the method comprising:
   receiving a multi-channel audio stream;
   splitting the multi-channel audio stream into a plurality of audio channels and a set of haptic channels separate from the plurality of audio channels;
   deriving a plurality of haptic signals based on the set of haptic channels; and
   for each haptic signal of the plurality of haptic signals, transmitting the haptic signal to a corresponding haptic device of the plurality of haptic devices to produce the haptic feedback;
   wherein data bit rate of the set of haptic channels, separate from the plurality of audio channels, is lower than data bit rate of the plurality of audio channels;
   wherein each haptic channel of the set of haptic channels comprises sound for haptic effect and haptic metadata, wherein the haptic metadata comprises static metadata and dynamic metadata;
   for each haptic channel of the set of haptic channels, determining a corresponding haptic device based on the haptic metadata contained within the haptic channel;
   wherein the static metadata, of the haptic metadata for determining the corresponding haptic device, comprises a (i) a sound type, being a type of sound effect, and (ii) a recommended haptic device for receiving a haptic signal corresponding to the haptic channel.

7. The method of claim 6, wherein the plurality of haptic devices comprises one or more of a keyboard, a computer mouse, a chair backrest, a chair seat, or a headset.

8. The method of claim 6, wherein the static metadata further comprises a position where haptic vibration should be generated.

9. The method of claim 6, wherein the dynamic metadata comprises relative intensity level.

10. The method of claim 6, wherein each haptic channel of the set of haptic channels is dedicated to drive one haptic device of the plurality of haptic devices.

11. The method of claim 6, wherein the set of haptic channels comprises a dedicated haptic data signal, wherein the plurality of haptic signals are derived from haptic metadata information in the dedicated haptic data signal.

12. The method of claim 1, wherein the plurality of different types of haptic devices comprises two or more of a keyboard, a computer mouse, a chair backrest, a chair seat, or a headset.

13. The method of claim 6,
wherein the multi-channel audio stream contains sound frequencies beyond the human hearing range, and
wherein the split set of haptic channels is based on the frequencies beyond the human hearing range of the multi-channel audio stream.

14. The method of claim 1,
wherein the plurality of sound effects comprise at least one or more of a weapon shot sound effect, a weapon recoil sound effect, an explosion sound effect, a moving vehicle sound effect, a footstep sound effect, and/or a weather sound effect.

15. The method of claim 1,
wherein the respective unique sound effect, associated with the respective type of haptic device, comprises a weapon shot sound effect, a weapon recoil sound effect, an explosion sound effect, a moving vehicle sound effect, a footstep sound effect, or a weather sound effect.

16. The method of claim 1,
wherein the respective unique sound effect, associated with the respective type of haptic device, comprises a weapon shot sound effect by a respective gamer of a plurality of gamers.

17. The method of claim 6,
wherein the sound effect comprises a weapon shot sound effect, a weapon recoil sound effect, an explosion sound effect, a moving vehicle sound effect, a footstep sound effect, or a weather sound effect.

18. The method of claim 6,
wherein the sound effect comprises a weapon shot sound effect by a respective gamer of a plurality of gamers.

* * * * *